United States Patent
Yamamoto et al.

(10) Patent No.: US 12,508,369 B2
(45) Date of Patent: Dec. 30, 2025

(54) NEEDLELESS INJECTOR

(71) Applicant: DAICEL CORPORATION, Osaka (JP)

(72) Inventors: Yuzo Yamamoto, Tokyo (JP); Hiromitsu Iga, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 786 days.

(21) Appl. No.: 17/415,956

(22) PCT Filed: Dec. 27, 2019

(86) PCT No.: PCT/JP2019/051554
§ 371 (c)(1),
(2) Date: Jun. 18, 2021

(87) PCT Pub. No.: WO2020/138474
PCT Pub. Date: Jul. 2, 2020

(65) Prior Publication Data
US 2022/0072231 A1    Mar. 10, 2022

(30) Foreign Application Priority Data

Dec. 27, 2018 (JP) .................. 2018-245622

(51) Int. Cl.
*A61M 5/30* (2006.01)
*A61M 5/20* (2006.01)
*A61M 5/315* (2006.01)

(52) U.S. Cl.
CPC ............ *A61M 5/30* (2013.01); *A61M 5/2046* (2013.01); *A61M 5/31501* (2013.01);
(Continued)

(58) Field of Classification Search
CPC .......... A61M 2005/3151; A61M 2005/31508; A61M 5/488; A61M 5/30; A61M 5/31501; A61M 5/2046; A61M 2005/2086
See application file for complete search history.

(56) References Cited

U.S. PATENT DOCUMENTS 4,919,652 A * 4/1990 Alter .................. A61M 5/31511
604/110
5,599,302 A   2/1997 Lilley et al.
(Continued)

FOREIGN PATENT DOCUMENTS

JP    10-512165 A    11/1998
JP    2001-505069 A   4/2001
(Continued)

OTHER PUBLICATIONS

English translation of the Japanese Decision of Dismissal of Amendment for Japanese Application No. 2020-562537, dated Jul. 11, 2023.
(Continued)

*Primary Examiner* — Courtney B Fredrickson
*Assistant Examiner* — Kayla M. Turkowski
(74) *Attorney, Agent, or Firm* — BIRCH, STEWART, KOLASCH & BIRCH, LLP

(57) ABSTRACT

A needleless injector includes a housing part including an accommodating space that is configured to accommodate a substance intended for injection an actuator configured to generate an ejection energy and a plunger coupled to the housing part so as to define the accommodating space, including a weakened part and a distal end, and configured to receive the ejection energy from the actuator as a driving force. The plunger is further configured to move in the housing part by the driving force so that the distal end reaches to a deepest part of the housing part when the driving force is equal to or smaller than a predefined force, (Continued)

and deform at the weakened part by the driving force before the distal end reaches to the deepest part of the housing part when the driving force exceeds the predefined force.

11 Claims, 16 Drawing Sheets

(52) U.S. Cl.
CPC ............... *A61M 2005/3151* (2013.01); *A61M 2005/31516* (2013.01); *A61M 2205/3331* (2013.01)

(56) References Cited

U.S. PATENT DOCUMENTS

| | | | |
|---|---|---|---|
| 5,643,211 | A | 7/1997 | Sadowski et al. |
| 5,697,917 | A | 12/1997 | Sadowski et al. |
| 5,722,953 | A | 3/1998 | Schiff et al. |
| 5,800,388 | A | 9/1998 | Schiff et al. |
| 5,846,233 | A | 12/1998 | Lilley et al. |
| 5,875,976 | A | 3/1999 | Nelson et al. |
| 5,891,085 | A | 4/1999 | Lilley et al. |
| 5,919,159 | A | 7/1999 | Lilley et al. |
| 5,921,967 | A | 7/1999 | Sadowski et al. |
| 6,309,371 | B1 | 10/2001 | Deboer et al. |
| 2002/0058907 | A1 | 5/2002 | Deboer et al. |
| 2007/0049864 | A1 | 3/2007 | Hansen |
| 2009/0137949 | A1* | 5/2009 | Landau .................. A61M 5/30 604/70 |
| 2011/0092903 | A1* | 4/2011 | Caizza .................. A61M 5/502 604/110 |
| 2011/0288492 | A1* | 11/2011 | Holmqvist .......... A61M 5/2033 604/208 |
| 2015/0051546 | A1* | 2/2015 | Weiss .................. A61M 5/1452 604/121 |
| 2019/0125973 | A1 | 5/2019 | Fukushima et al. |

FOREIGN PATENT DOCUMENTS

| | | | |
|---|---|---|---|
| JP | 2007-512054 | A | 5/2007 |
| JP | 2009-56339 | A | 3/2009 |
| JP | 2012-161431 | A | 8/2012 |
| JP | 2013-146452 | A | 8/2013 |
| JP | 2014-238845 | A | 12/2014 |
| JP | 6215582 | B2 | 10/2017 |
| WO | WO 2017/126676 | A1 | 7/2017 |

OTHER PUBLICATIONS

Extended European Search Report for European Application No. 19903005.7, dated Sep. 23, 2022.
Extended European Search Report for European Application No. 19903437.2, dated Aug. 4, 2022.
International Search Report for International Application No. PCT/JP2019/051554, dated Mar. 17, 2020, with English translation.
Written Opinion of the International Searching Authority for International Application No. PCT/JP2019/051554, dated Mar. 17, 2020, with English translation.
English translation of the Japanese Office Action for Japanese Application No. 2020-562537, dated Jan. 31, 2023.
International Search Report and Written Opinion of the International Searching Authority for International Application No. PCT/JP2019/051556, dated Mar. 17, 2020, with English translation.

\* cited by examiner

NEEDLELESS INJECTOR

FIELD

The present disclosure relates to a needleless injector that ejects a substance intended for injection to a target region without using an injection needle.

BACKGROUND

An example of a device that ejects a liquid chemical to a target region such as an organism includes a needleless injector using no injection needle which has been attracting attention in terms of usability and sanitation, and thus has been actively developed recently. In general, there has been implemented a needleless injector having a configuration in which a liquid chemical pressurized by a driving source such as compressed gas and a spring is ejected to a target region and the liquid chemical is administered to an inside of the target region through use of the kinetic energy of the liquid chemical.

In this context, a needleless injector disclosed in Patent Document 1 includes a plunger that presses liquid chemical or the like and has a structure divided into two members along a plunging direction with the two members connected to each other via a bridge. When a driving source for injection is actuated, the bridge is destroyed by the energy provided from the driving source. As a result, one of the members on the upstream side presses the other member on the downstream side, whereby the liquid chemical is pressed. With such a configuration, whether the plunger is used or unused can be easily recognized.

Citation List

Patent Document

[Patent Document 1] JP 2001-505069 T

SUMMARY

Technical Problem

According to the prior art, the driving source provides energy upon being actuated, to deform the plunger from its original shape, Specifically, the bridge is destroyed, and the upstream side member of the plunger thus deformed presses the downstream side member to push the liquid chemical or the like. Thus, the plunger according to the prior art is designed such that desired liquid chemical or the like is ejected by the plunger after the deformation.

On the other hand, with the needleless injectors, the liquid chemical or the like is required to be delivered into a target region by being ejected by the energy applied due to the plunger pushing the liquid chemical. In view of this, general needleless injectors are designed to have components with sufficient strength so that the components are not damaged or destroyed by force applied thereto when the energy is provided for the delivery. Still, the needleless injectors cannot be completely free of risk of an unexpected amount of load being applied on its components due to some reason during the pressurization by the plunger. In particular, a component accommodating the liquid chemical or the like is under risk of such an excessive load because the pressurization operation of the plunger is directly applied to such a component. With a load overwhelming the expected level, the safety of injection using the needleless injector is compromised. Nevertheless, such a risk is mentioned nowhere in the prior art.

In view of the problem described above, an object of the present disclosure is to provide a technique that may guarantee safety of injection using a needleless injector, even when pressurization by a plunger leads to a load overwhelming an expected level.

Solution to Problem

To solve the above problem, the needleless injector of the present disclosure employs a configuration in which a plunger is intentionally deformed to reduce the moving force of the plunger when force applied to the plunger during the pressurization by the plunger exceeds an expected level. With such a configuration, a component of the needleless injector, particularly a housing part accommodating a substance intended for injection pressurized by the plunger, can be prevented from receiving the excessive force by the plunger.

Specifically, the present disclosure provides a needleless injector configured to eject a substance intended for injection to a target region without using an injection needle, the needleless injector including a housing part that includes an accommodating space that accommodates the substance intended for injection and defines a flow path from the accommodating space so that the substance intended for injection is ejected to the target region, a driving part that imparts ejection energy to eject the substance intended for injection, and a plunger that defines the accommodating space and is disposed to move in the housing part by the ejection energy and pressurize the substance intended for injection. The plunger includes a weakened part that causes a part of the plunger to deform such that, when force applied to the plunger exceeds predefined force while the driving part is imparting the ejection energy with the accommodating space accommodating the substance intended for injection, a distal end of the plunger does not reach a deepest part of the housing part or force received by an inner wall surface of the housing part falls within a predetermined range until the distal end of the plunger reaches the deepest part. Note that the deepest part includes a connection portion between the accommodating space and the flow path in the housing part. The needleless injector has a configuration in which the plunger moves toward the deepest part, thereby pushing the substance intended for injection into the flow path. However, the connection portion with the flow path at the deepest part is not limited to a specific position.

In the needleless injector, the driving part imparts the ejection energy to the substance intended for injection accommodated in the housing part, and thus the substance intended for injection is ejected to the target region. In the present application, "ejection" is achieved by the plunger moving in the housing part through the ejection energy imparted by the driving part and thus pressurizing the substance intended for injection in the housing part, so that the substance intended for injection flows through the flow path in the housing part.

Further, as the substance intended for injection ejected from the needleless injector, predetermined substances including a component expected to have effects in the target region or a component expected to exert a predetermined function in the target region can be exemplified. Thus, as long as at least ejection by the ejection energy described above can be achieved, a physical mode of the substance intended for injection may be in a state of being dissolved in liquid, or may be in a state of simply being mixed without being dissolved in liquid. As one example, the predetermined substance to be sent includes vaccine for intensifying an antibody, a protein for cosmetic enhancement, a cultured cell for hair regeneration, and the like, and is included in a liquid medium in an ejectable manner. The substance intended for injection is formed in this way. Note that the medium is preferably a medium that does not hinder the above-mentioned effect and function of the predetermined substance in a state of being injected into the target region. As another method, the medium may be a medium that exerts the above-mentioned effect and function by acting together with the predetermined substance in the state of being injected into the target region.

The ejected substance intended for injection needs to penetrate the surface of the target region such that the substance intended for injection is ejected from the needleless injector to the target region to be delivered into the inside thereof. Thus, at an ejection initial state, the substance intended for injection needs to be ejected to the target region at a relatively high speed. In view of this point, as an example, the driving part preferably imparts the ejection energy using a combustion product discharged by combustion of an ignition charge. Note that, as the ignition charge, there may be employed any one of an explosive containing zirconium and potassium perchlorate, an explosive containing titanium hydride and potassium perchlorate, an explosive containing titanium and potassium perchlorate, an explosive containing aluminum and potassium perchlorate, an explosive containing aluminum and bismuth oxide, an explosive containing aluminum and molybdenum oxide, an explosive containing aluminum and copper oxide, an explosive containing aluminum and iron oxide, or an explosive composed of a combination of a plurality of the explosives of the above. As characteristics of the above-mentioned ignition charge, the combustion product is gas at a high temperature but does not include a gas component at a room temperature, hence the combustion product is condensed immediately after the ignition. As a result, the driving part can impart the ejection energy in an extremely short period of time. In addition, the driving part may utilize electrical energy such as a piezoelectric element or the like or mechanical energy such as a spring as the ejection energy instead of the ejection energy caused by the combustion of the ignition charge, and may generate the ejection energy by appropriately combining these forms of energy.

Here, the plunger is configured to pressurize the substance intended for injection in the housing part through the ejection energy imparted by the driving part. Thus, during the pressurization by the plunger, relatively large force can be applied to the housing part itself constituting the needleless injector. In particular, due to the pressurization by the plunger, the substance intended for injection will be pushed into the flow path provided in the housing part, so that the housing part will be subjected to force directly from the plunger or through the substance intended for injection until the plunger moving in the housing part toward the deepest part is in direct contact with the deepest part.

Thus, in the needleless injector described above, the plunger includes the weakened part that causes a part of the plunger to deform such that, when force applied to the plunger exceeds predefined force while the substance intended for injection is being pressurized for some reason, the distal end of the plunger does not reach the deepest part of the housing part. Note that the predefined force is a threshold of the force applied to the plunger while undesirably large force is being applied to the housing part. Then, the weakened part causes a part of the plunger to deform when force exceeding predefined force is applied to the plunger for some reason when the driving part is actuated, consuming a part of the ejection energy by the deformation to weaken the moving force of the plunger or to shorten its moving distance, thereby preventing the plunger from reaching the deepest part. Because the deepest part also serves as a portion that receives and stops the moving plunger during normal operation, it is easily subjected to force directly from the plunger. However, by the weakened part causing a part of the plunger to deform when force exceeding predefined force is applied to the plunger as described above, contact beyond predefined force between the plunger and the deepest part is avoided. This prevents excessive force from being applied to the housing part, and the safety of the injection using the needleless injector can be guaranteed. Note that "deformation" by the weakened part in the present application includes any structural change in the plunger in which a part of the ejection energy is consumed, such as damage, destruction, and the like.

The weakened part of the needleless injector described above may cause a part of the plunger to deform to consume a part of the ejection energy such that, when force applied to the plunger exceeds predefined force during the pressurization of the substance intended for injection, the force received by, the inner wall surface of the housing part falls within a predetermined range until the distal end of the plunger reaches the deepest part of the housing part. Note that the predetermined range is a range of force applied to the housing part under which the safety of the needleless injector can be suitably guaranteed without damage, deformation, or the like. This deformation of the weakened part can also avoid excessive force being applied to the housing part and guarantee the safety of the injection using the needleless injector. Note that in cases where the weakened part is formed in this manner, the distal end of the plunger may or may not reach the deepest part when the weakened part is deformed. That is, the weakened part deforms when force exceeding predefined force is applied to the plunger and does not substantially deform when force below it is applied thereto. In other words, the weakened part may be a part of the plunger that preferentially deforms when force exceeding predefined force is applied to the plunger and can be formed having lower strength than another part of the plunger.

In the above-described needleless injector, when the force applied to the plunger exceeds the predefined force, the weakened part may be configured to cause a part of the plunger to deform such that frictional force during movement of the plunger in the housing part when a part of the plunger is deformed is greater than frictional force during movement of the plunger in the housing part when the part is not deformed. In the needleless injector according to an alternative aspect, when the force applied to the plunger exceeds the predefined force, the weakened part may be configured to cause a part of the plunger to deform such that a length of the plunger in an axial direction is shortened. These configurations allow a part of the ejection energy, which is a factor causing force exceeding predefined force, to be consumed by deformation of a part of the plunger by the weakened part, an increase in the frictional force during movement, the shortening of the plunger in the axial direction, or a combination of at least two or more of these elements, whereby the plunger can be prevented from reaching the deepest part and the force received by the inner wall surface of the housing part can fall within a predetermined range.

Here, the needleless injector described above may further include a piston disposed to move inside the needleless injector in a predetermined direction by the ejection energy imparted. The plunger may be disposed adjacent to the piston. The plunger may further include a rod part made of resin that receives the ejection energy from the piston, and a stopper portion capable of sealing the substance intended for injection in the accommodating space, the stopper portion being attached to the distal end of the plunger and moving together with the rod part. The weakened part may be disposed in the rod part. That is, by providing the weakened part on the rod part located closer to the piston, between the rod part and the stopper portion constituting the plunger, deformation due to the weakened part can be suitably achieved when the ejection energy is transferred from the piston to the plunger and force exceeding predefined force is applied thereto. In addition, because the stopper portion also serves as a portion that seals the substance intended for injection, it is not preferable that the weakened part is provided to the stopper portion in order to avoid any unfavorable effects working on the sealing state.

Note that four forms of the arrangement of the weakened part in the rod part are illustrated below. In a first embodiment, the weakened part may be one or a plurality of recess portions disposed in a non-uniform manner in a circumferential direction of the rod part. In a second embodiment, the rod part may have a first diameter, and the weakened part may be a reduced diameter portion having a second diameter smaller than the first diameter. In a third embodiment, the weakened part may be a groove portion extending in a circumferential direction over a portion or an entirety of the rod part. In a fourth embodiment, the weakened part may be a through hole or a thin portion formed inside the rod part and extending in a radial direction of the rod part. By configuring the weakened part in these ways, the plunger can be accurately caused to deform when the force applied thereto exceeds predefined force that is a set threshold, thereby effectively slowing down the plunger.

Advantageous Effects of Invention

The safety of the injection using the needleless injector can be guaranteed even when pressurization by a plunger results in an unexpected amount of load.

DESCRIPTION OF EMBODIMENTS

With reference to the drawings, a needleless injector 1 according to an embodiment of the present disclosure (herein, simply referred to as "injector") is described below. The injector 1 is a needleless injector that implements injection by ejecting an ejection solution, which corresponds to a substance intended for injection in the present application, to a target region through use of a combustion energy of an explosive, that is, a device that injects the ejection solution to the target region without using an injection needle.

Note that each of the configurations, combinations thereof, and the like in each embodiment are an example, and various additions, omissions, substitutions, and other changes may be made as appropriate without departing from the spirit of the present disclosure. The present disclosure is not limited by the embodiments and is limited only by the claims. Note that, in the present embodiment, as terms indicating a relative positional relationship in a longitudinal direction of the injector 1, "distal end side" and "base end side" are used. The "distal end side" indicates a side closer to the distal end of the injector 1 described later, that is, a position closer to an ejection port 77, and the "base end side" indicates a side in an opposite direction to the "distal end side" in a longitudinal direction of the injector 1, that is, a direction to an igniter 22 side of an injector assembly 10 (see FIG. 5 described later).

Configuration of Injector 1

Figure 1:
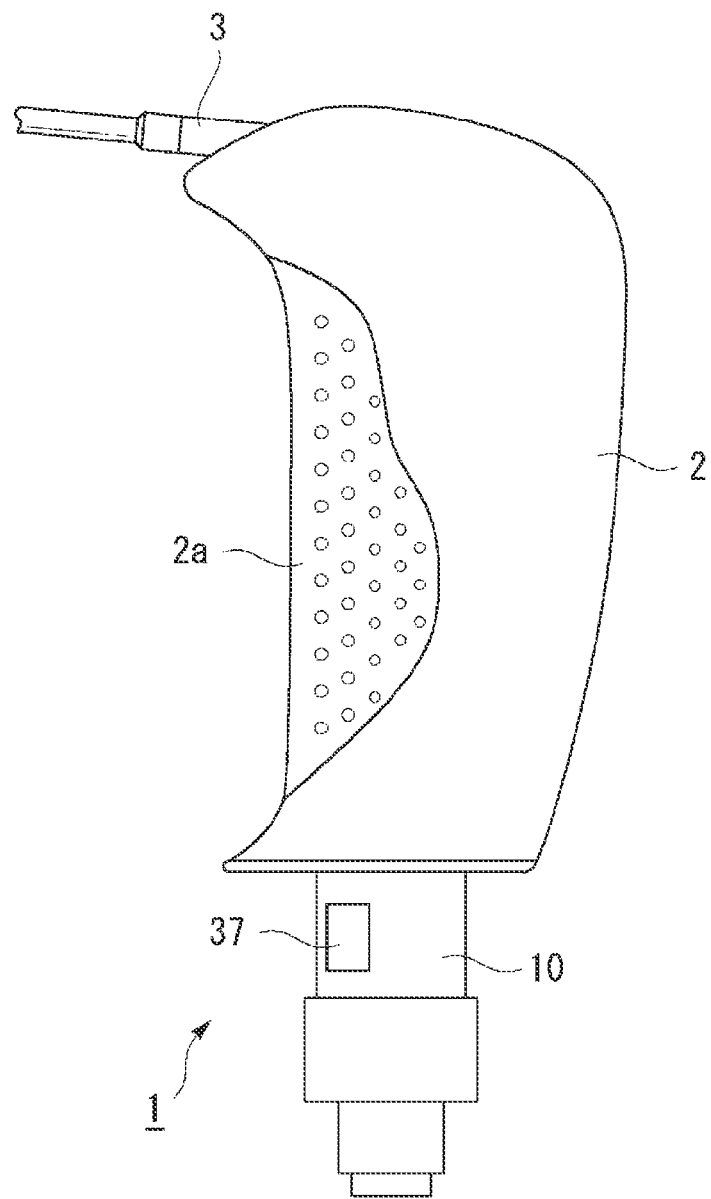
FIG. 1 is a diagram illustrating a schematic configuration of a needleless injector.
Figure 2:
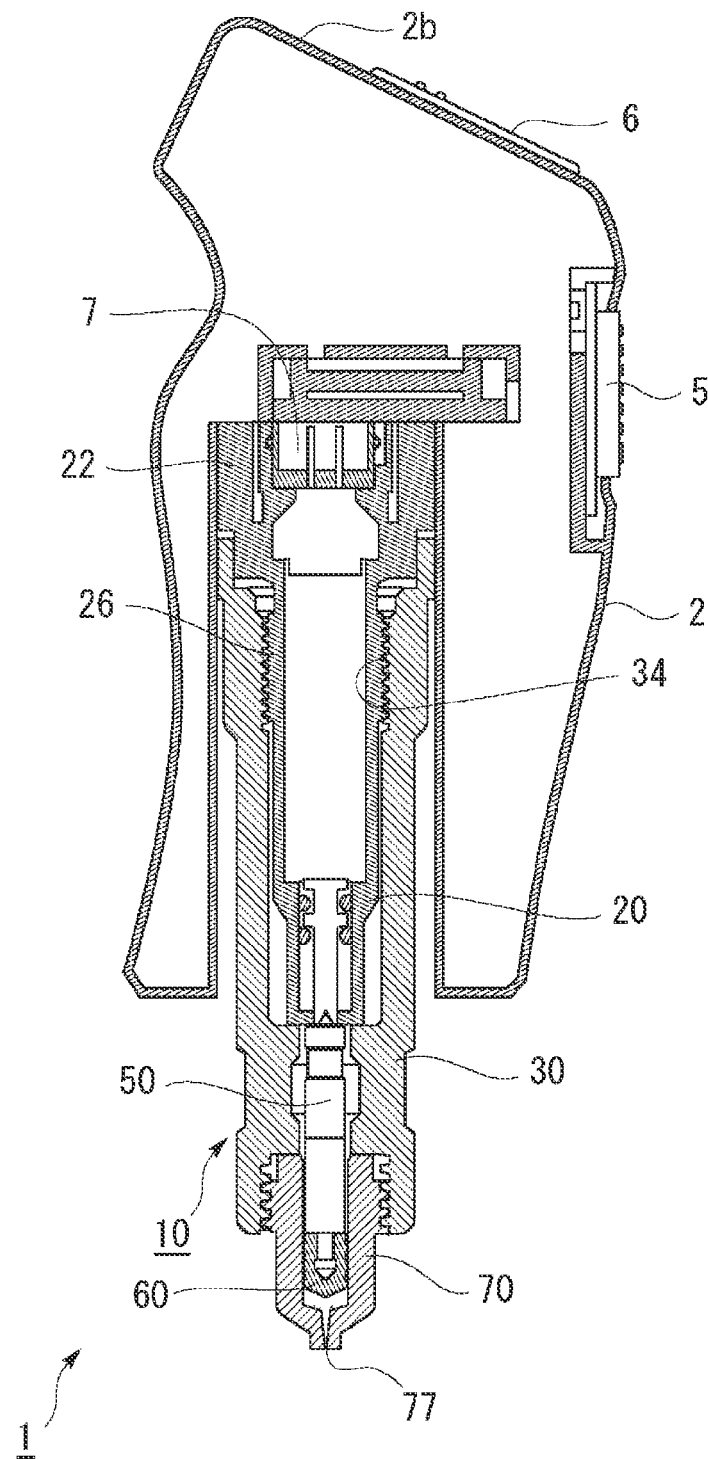
FIG. 2 is a first cross-sectional view of a needleless injector.
Figure 3:
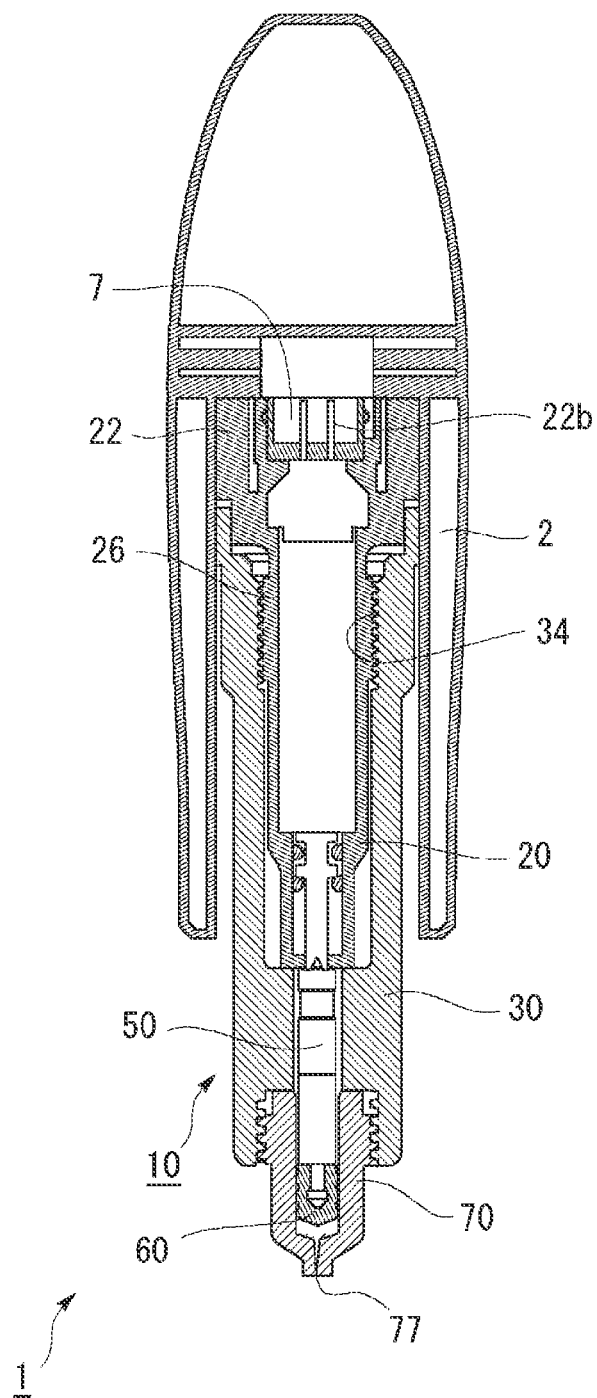
FIG. 3 is a second cross-sectional view of the needleless injector.
Figure 4:
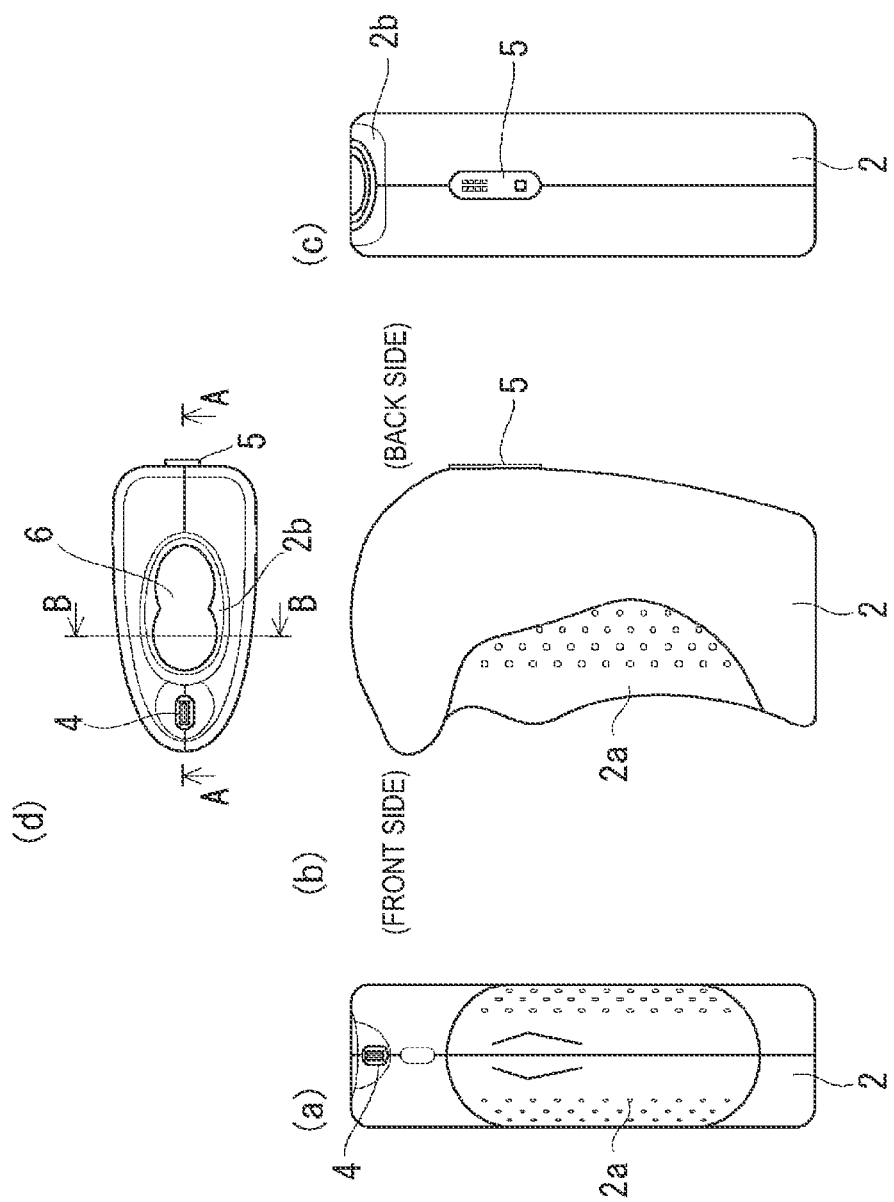
FIG. 4 is a diagram illustrating a configuration of a housing of the needleless injector.

Here, FIG. 1 is a diagram schematically illustrating the appearance of the injector 1. FIG. 2 is a first cross-sectional view of the injector 1, which is an AA cross section in FIG. 4, described below. FIG. 3 is a second cross-sectional view of injector 1, a BB cross section in FIG. 4 described below. The BB cross section is orthogonal to the AA cross section. Note that FIG. 4 is a diagram illustrating a configuration of a housing 2 that is a part of the injector 1. Here, the injector 1 is formed with the injector assembly 10 attached to the housing 2. A power cable 3 for supplying drive current to the igniter 22 in the injector assembly 10 is connected to the housing 2.

Note that, in the following description in the present application, the ejection solution ejected to the target region by the injector 1 is formed of a liquid medium including a predetermined substance, which exerts an effect or a function expected in the target region. In the ejection solution, the predetermined substance may be in a state of being dissolved in liquid being a medium, or may be in a state of being simply mixed instead of being dissolved.

For example, examples of the predetermined substance included in the ejection solution include an organism-derived substance and a substance with a desired bioactivity, which can be ejected to the target region being an organism. For example, examples of the organism-derived substance include DNA, RNA, a nucleic acid, an antibody, and a cell. Examples of the substance with a desired bioactivity include various substances exerting pharmacological or therapeutic effects, which are exemplified by medicines composed of low molecular compounds, proteins, peptides, or the like, a vaccine, an inorganic substance such as metal particles for thermotherapy or radiotherapy, and a carrying body functioning as a carrier. Further, the liquid being the medium of the ejection solution is only required to be a substance suitable for administering the predetermined substance exemplified by those substances to the target region, and may be aqueous or oleaginous, which is not limited. Further, viscosity of the liquid being the medium is not particularly limited as long as the predetermined substance can be ejected by the injector 1.

In the injector 1, the injector assembly 10 is freely attachable to and detachable from the housing 2. An accommodating space 75 (see FIG. 5) formed between a container 70 and a plunger 80 in the injector assembly 10 is filled with ejection solution during a preparation stage before the operation of the injector 1. The injector assembly 10 is a unit that is replaced each time the ejection solution is ejected. The injector assembly 10 will be described in detail below.

On the other hand, the housing 2 has a grip portion 2a formed to be gripped by a user of the injector 1 in use, and is provided with a plurality of switches for operating the injector 1 to eject the ejection solution. Note that the injector 1 is configured to be capable of being held and operated by one hand of the user. In this context, the housing 2 will be described with reference to FIG. 4. In FIG. 4, (a) illustrates the outer appearance of the housing 2 as viewed from the front side, (b) illustrates the outer appearance of the housing 2 as viewed from one side, (c) illustrates the outer appearance of the housing 2 as viewed from the back side, and (d) illustrates the outer appearance of the housing 2 as viewed from the upper side. Here, "front side" indicates a portion positioned on the distal side of the user holding the housing 2, which is the left side in FIG. 4(b), and "back side" indicates a portion positioned on the proximal side of the user holding the housing 2, which is the right side in FIG. 4(b). Thus, when the user holds the housing 2 with one hand, fingertips rest on the front side of the distal housing 2 which is the distal side, and the wrist is in the vicinity of the back side of the housing 2 which is the proximal side. The "upper side" is a portion of the injector 1 on the base end side.

Considering such a way of holding by the user, the grip portion 2a is provided at a front side portion of the housing 2 so that the user can easily rest his or her fingertips thereon. The grip portion 2a is provided with a plurality of dimples making the user's fingertips even easier to be rested thereon. Furthermore, the grip portion 2a has gentle recesses and protrusions on the front side of its outer shell (see (b) in FIG. 4) so that the user's forefinger and middle finger can be easily rested thereon, for the sake of more stable holding of the housing by the user.

Further, the housing 2 is provided with a first switch 5 and a second switch 6 that are two operating switches for operating the injector 1. A first switch 5 and a second switch 6 are connected to a control unit, such as a microcomputer (not illustrated). The control unit controls the supply of ignition current to the igniter 22 based on a signal from each switch, thereby controlling an operation of the injector 1. The first switch 5 is a sliding switch provided on the back side of the housing 2, the sliding direction of which being an upward and downward direction of the housing 2 (direction between the distal end and the base end). The first switch 5 is constantly biased in the upward direction. The user can achieve a standby state of the injector 1 by continuously sliding the first switch 5 downward (toward the distal end side) for a predetermined period of time against the biasing force. The standby state is a state in which the injector 1 is ready to eject the ejection solution. When a user makes an additional operation in this state, the ejection is implemented.

The second switch 6 is a press type switch provided on an inclined surface 2b on the upper side of the housing 2. The user can press the second switch 6 in a direction toward the inner side of the housing 2. The control unit is configured to supply an ignition current to the igniter 22 in response to the pressing operation on the second switch 6 while the injector 1 is in the standby state as a result of the operation on the first switch 5 described above. A connector 4 to which the power cable 3 is connected is provided on the front side of the inclined surface 2b on the upper side of the housing 2. In the present embodiment, the connector 4 is a USB connector, and the power cable 3 is freely attachable to and detachable the housing 2.

Note that, as described above, in the present embodiment, the power for actuating the igniter 22 is supplied from the outside through the power cable 3. Alternatively, a battery for supplying such power may be provided inside the housing 2. In this case, the housing 2 can be repeatedly used while replacing the injector assembly 10, until the battery runs out. When the battery runs out, the battery may be replaced.

Figure 5:
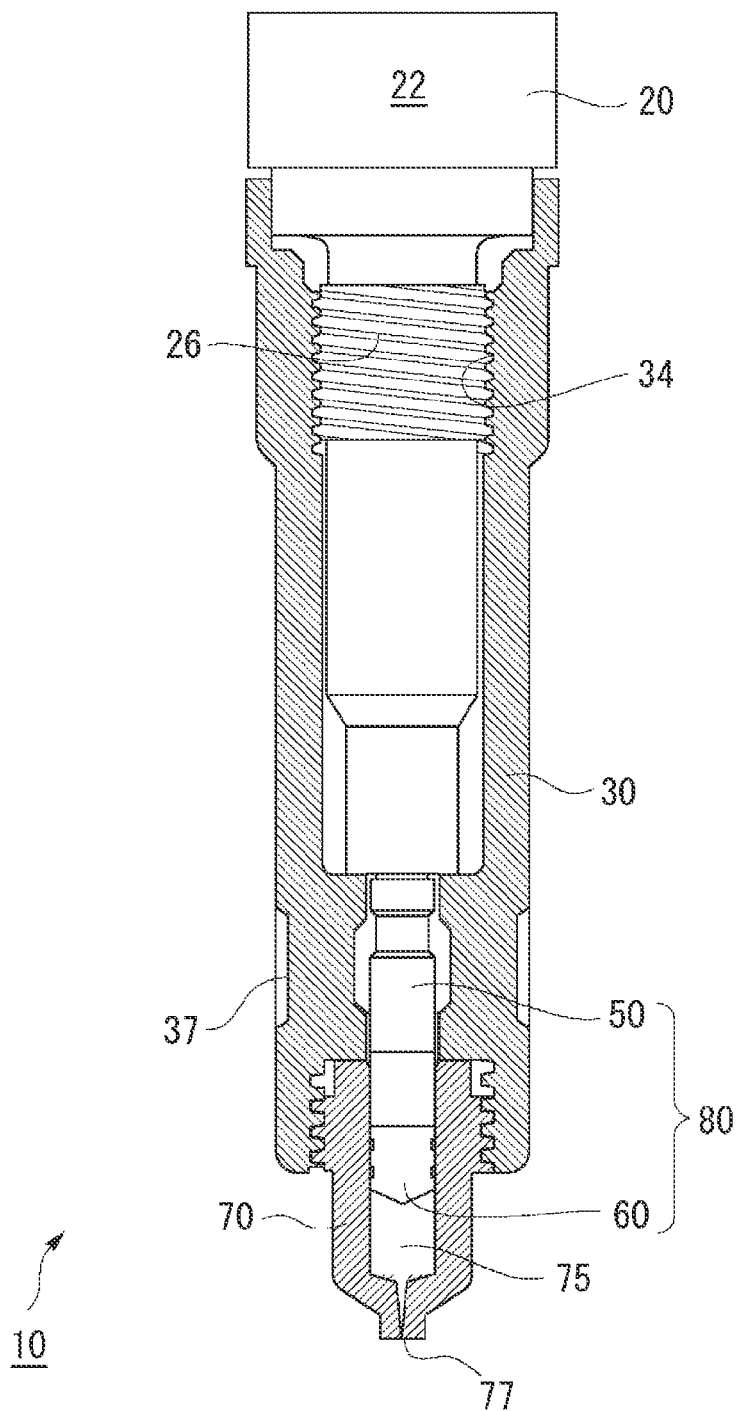
FIG. 5 is a diagram illustrating a schematic configuration of injector assembly incorporated in the needleless injector.

A schematic configuration of the injector assembly 10 is illustrated in FIG. 5. The injector assembly 10 is attached to the housing 2 to form the injector 1, as illustrated in FIGS. 2 and 3. Specifically, the injector assembly 10 is an assembly including an actuator 20, an attachment 30, the container 70, and the plunger 80. How the injector assembly 10 is assembled will be described below.

Figure 6:
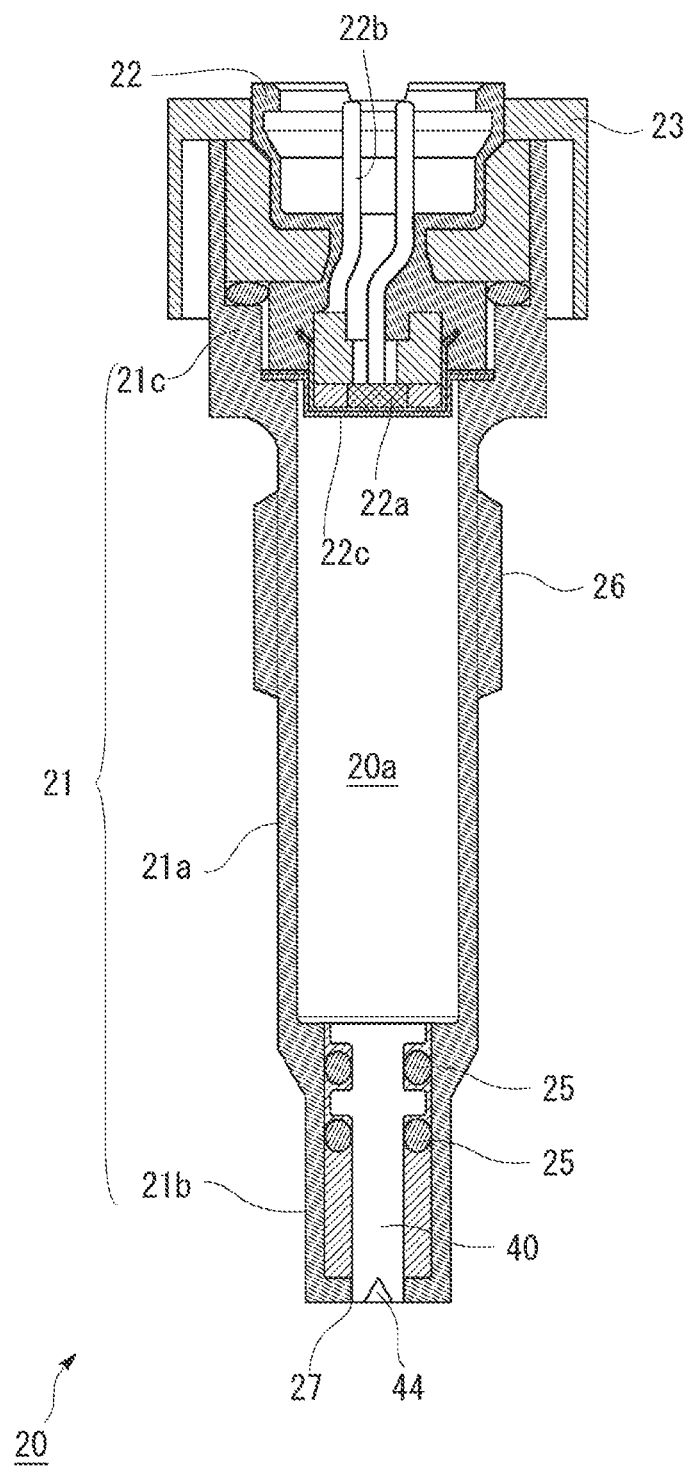
FIG. 6 is a diagram illustrating a schematic configuration of actuator incorporated in the needleless injector.

First of all, the actuator 20 will be described with reference to FIG. 6. The actuator 20 has a body 21 formed in a cylindrical shape. The body 21 includes a center portion 21a in the center thereof, a distal end portion 21b on the distal end side thereof, and a base end portion 21c on the base end side thereof. The distal end portion 21b, the center portion 21a, and the base end portion 21c of the body 21 have their internal spaces in communication with each other. The distal end portion 21b has an opening 27 on the distal end side. The igniter 22, which is an electric igniter that generates energy for ejection through combustion of an ignition charge 22a, is attached to the base end portion 21c of the body 21 via a cap 23. The igniter 22 has an ignition pin 22b to which ignition current is supplied from the outside. The ignition pin 22b is coupled to a socket 7 on the side of the housing 2 in a state in which the injector assembly 10 is attached to the housing 2. The attachment state of the igniter 22 to the body 21 is determined such that a combustion product generated by the operation of the igniter 22 is discharged toward the center portion 21a of the body 21. Specifically, the igniter 22 is attached to the base end portion 21c of the body 21 to have a discharge surface 22c, from which the combustion product is discharged, directed toward the center portion 21a.

Herein, a combustion energy used in the igniter 22 for the ignition charge is an energy for the injector 1 to eject the ejection solution to the target region. Note that, examples of the ignition charge include an explosive containing zirconium and potassium perchlorate (ZPP), an explosive containing titanium hydride and potassium perchlorate (THPP), an explosive containing titanium and potassium perchlorate (TiPP), an explosive containing aluminum and potassium perchlorate (APP), an explosive containing aluminum and bismuth oxide (ABO), an explosive containing aluminum and molybdenum oxide (AMO), an explosive containing aluminum and copper oxide (ACO), an explosive containing aluminum and iron oxide (AFO), or an explosive composed of a combination of a plurality of these explosives. These explosives exhibit characteristics that, although the explosives generate high-temperature and high-pressure plasma during combustion immediately after ignition, when the combustion product condenses at room temperature, the explosives do not contain gaseous components and hence the pressure generated decreases abruptly. An explosive other than these may be used as the ignition charge as long as appropriate ejection of the ejection solution can be performed.

Figure 7:
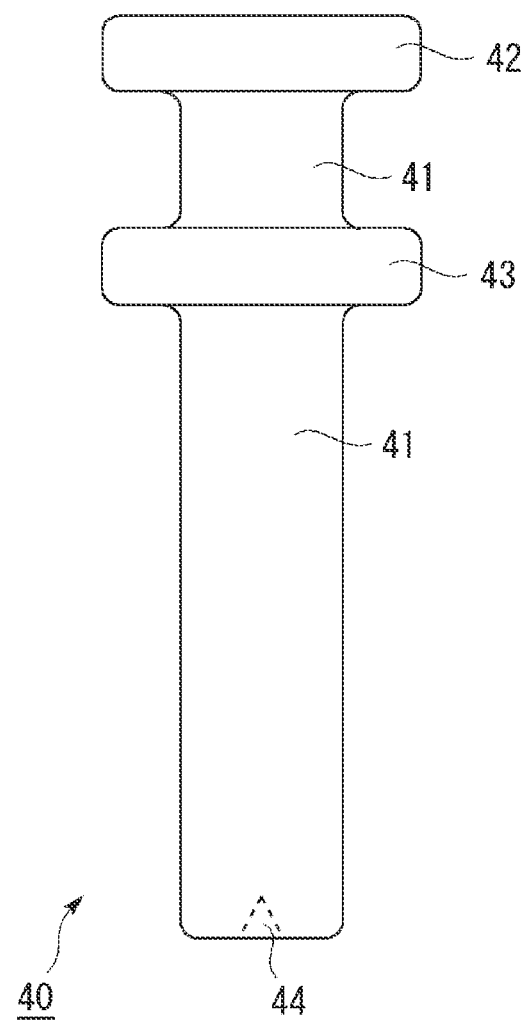
FIG. 7 is a diagram illustrating a schematic configuration of a piston incorporated in the needleless injector.

The internal space of the center portion 21a of the body 21 serves as a combustion chamber 20a into which a combustion product is discharged from the igniter 22. Furthermore, a male thread portion 26 is formed in a part of the outer surface of the center portion 21a. The male thread portion 26 is configured to mate with a female thread portion 32 of the attachment 30 described below. The effective lengths of the male thread portion 26 and the female thread portion 32 are determined to guarantee sufficient coupling force therebetween. The internal space of the distal end portion 21b adjacent to the center portion 21a is formed in a cylindrical shape in which a piston 40 is slidably provided and O rings 25 serving as a sealing member are also provided. The piston 40 is made of metal, has a shaft member 41, is provided with a first flange 42 on the base end side thereof, and is further provided with a second flange 43 in the vicinity of the first flange 42, as illustrated in FIG. 7. The first flange 42 and the second flange 43 have a disc shape, and have the same diameter. The O rings 25 include one disposed between the first flange 42 and the second flange 43 and one disposed on another side of the second flange 43. A recess portion 44 having a predetermined size is formed in a distal end surface of the shaft member 41. In a state where the piston 40 is disposed in the internal space of the distal end portion 21b before the actuation of the actuator 20, the first flange 42, which serves as a surface receiving pressure of the combustion product from the igniter 22, is exposed on side of the combustion chamber 20a, and the distal end of the shall member 41 of the piston 40 is inserted into the opening 27.

Then, when the igniter 22 is activated and the combustion product is discharged into the combustion chamber 20a and thus the pressure therein rises, the first flange 42 receives the pressure, resulting in the piston 40 sliding toward the distal end side. Thus, the actuator 20 has a mechanism with the igniter 22 serving as an actuation source and the piston 40 serving as an output unit. Since the second flange 43 has a larger diameter than the opening 27, the distance by which the piston 40 can slide is limited. Thus, the distance by Which the shaft member 41 of the piston 40 can protrude from the distal end surface of the distal end portion 21b of the body 21 is limited. Further, the piston 40 may be formed of a resin, and in such case, metal may be used together for a part to which heat resistance and pressure resistance are required.

Additionally, as an alternative mechanism to adjust the pressure applied to the piston 40, the combustion chamber 20a of the actuator 20 may be further provided with a gas generating agent that is burned by the combustion product from the igniter 22 to produce gas. The agent may be disposed, for example, at a location that may be exposed to the combustion product from the igniter 22. Further, as another method, the gas generating agent may be disposed in the igniter 22 as disclosed in WO 01-031282, JP 2003-25950 A, and the like. As one example of the gas generating agent, there may be exemplified a single base smokeless explosive formed of 98 mass % of nitrocellulose, 0.8 mass % of diphenylamine, and 1.2 mass % of potassium sulfate. Further, various types of gas generating agents used in a gas generator for an air bag and a gas generator for a seat belt pretensioner may be used. A combustion completion time period of the gas generating agent can be changed by adjusting a dimension, a size, a shape, and particularly, a surface shape of the gas generating agent at the time of being disposed in the combustion chamber 20a or the like. With this, the pressure applied to the piston 40 can be adjusted to a desired pressure.

Figure 8:
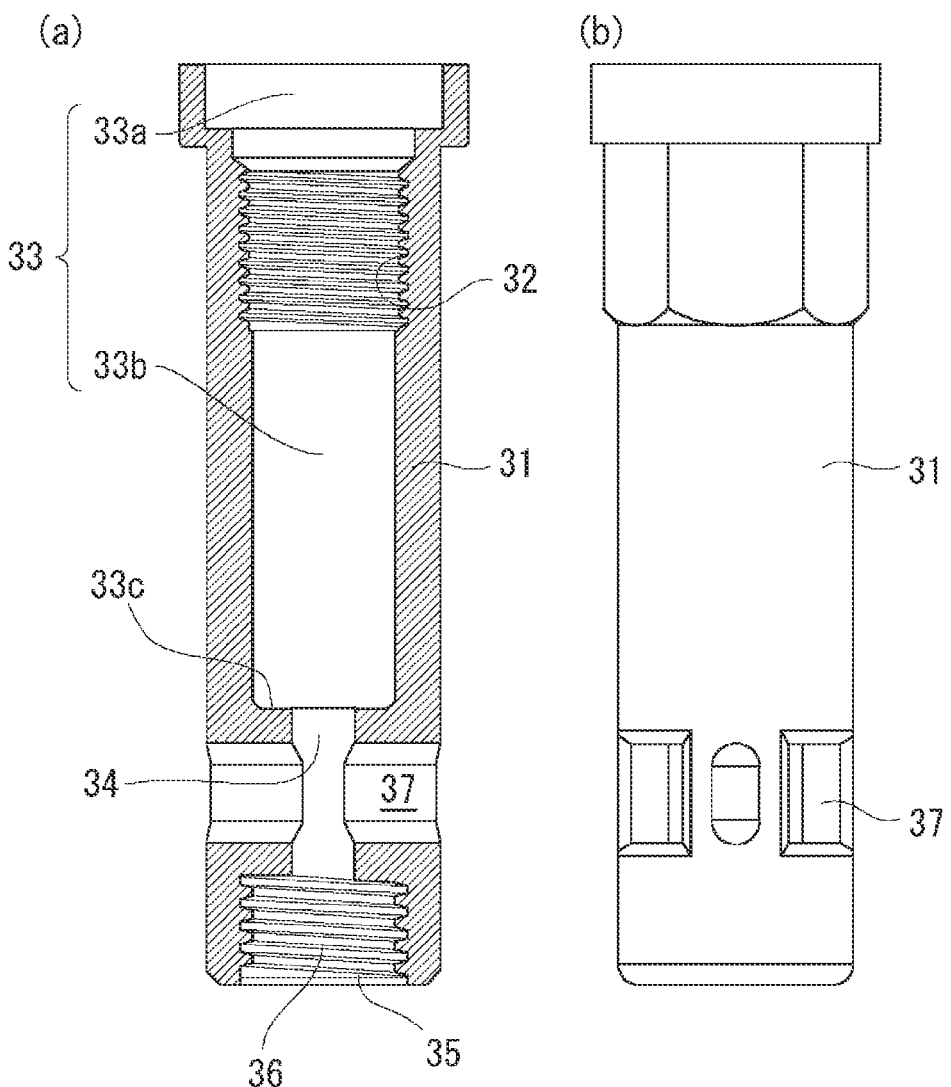
FIG. 8 is a diagram illustrating a schematic configuration of an attachment incorporated in the needleless injector.

Next, the attachment 30 will be described based on FIG. 8, Note that FIG. 8 includes the diagram (a) on the left side that is a cross-sectional view of the attachment 30, and the diagram (b) on the right side that is an external view of the attachment 30. The attachment 30 is a member for attaching the actuator 20, the plunger 80, and the container 70 as illustrated in FIG. 5. For a body 31 of the attachment 30, nylon 6-12, polyarylate, polybutylene terephthalate, polyphenylene sulphide, a liquid crystal polymer, or the like, which are publicly known, may be used for example. Further, a filler such as glass fibers and glass filler may be contained in those resins. 20 to 80 mass % of glass fibers may be contained in polybutylene terephthalate, 20 to 80 mass % of glass fibers may be contained in polyphenylene sulphide, or 20 to 80 mass % of minerals may be contained in a liquid crystal polymer.

The internal space of the body 31 includes a first region 33, extending from the base end side to the center, where the actuator 20 is disposed as illustrated in FIG. 5. The first region 33 includes a region 33a on the base end side where the base end portion 21c of the actuator 20 is generally positioned, and a region 33b on the distal end side of the first region 33 where the center portion 21a and the distal end portion 21b of the actuator 20 are generally positioned. The region 33h has a smaller diameter than the region 33a. The female thread portion 32 is disposed on the inner wall surface at a portion of the region 33b close to the region 33a. The female thread portion 32 is formed so as to engage with the male thread portion 26 provided on the center portion 21a of the actuator 20.

The internal space of the body 31 further includes a second region 34 in communication with the first region 33. The second region 34 is a region in which the plunger 80 is generally disposed as illustrated in FIG. 5, and is a hollow region formed in a cylindrical shape extending along the axial direction of the body 31. The second region 34 has one end in communication with the region 33b of the first region 33. The second region 34 has a diameter smaller that is smaller than the diameter of the region 33b, and enables a sliding movement of the plunger 80. A through hole 37 extends from a side outer surface of the attachment 30 to the second region 34, to be formed through the body 31.

Through the through hole 37, the user can check the status (such as whether the injector assembly 10 is before or after being actuated, for example) of the plunger 80 in the injector assembly 10 from the outside (see FIG. 1).

The internal space of the body 31 further includes a third region 35 in communication with the second region 34. The third region 35 is a region in which a part of the container 70 is generally disposed as illustrated in FIG. 5, and has one end in communication with the second region 34, and has the other end open to the distal end surface of the attachment 30. A female thread portion 36 for attachment to the container 70 is formed in the third region 35. The female thread portion 36 is screwed with a male thread portion 74 of the container 70 illustrated in FIG. 10 described below, whereby the attachment 30 and the container 70 are coupled to each other.

Figure 9:
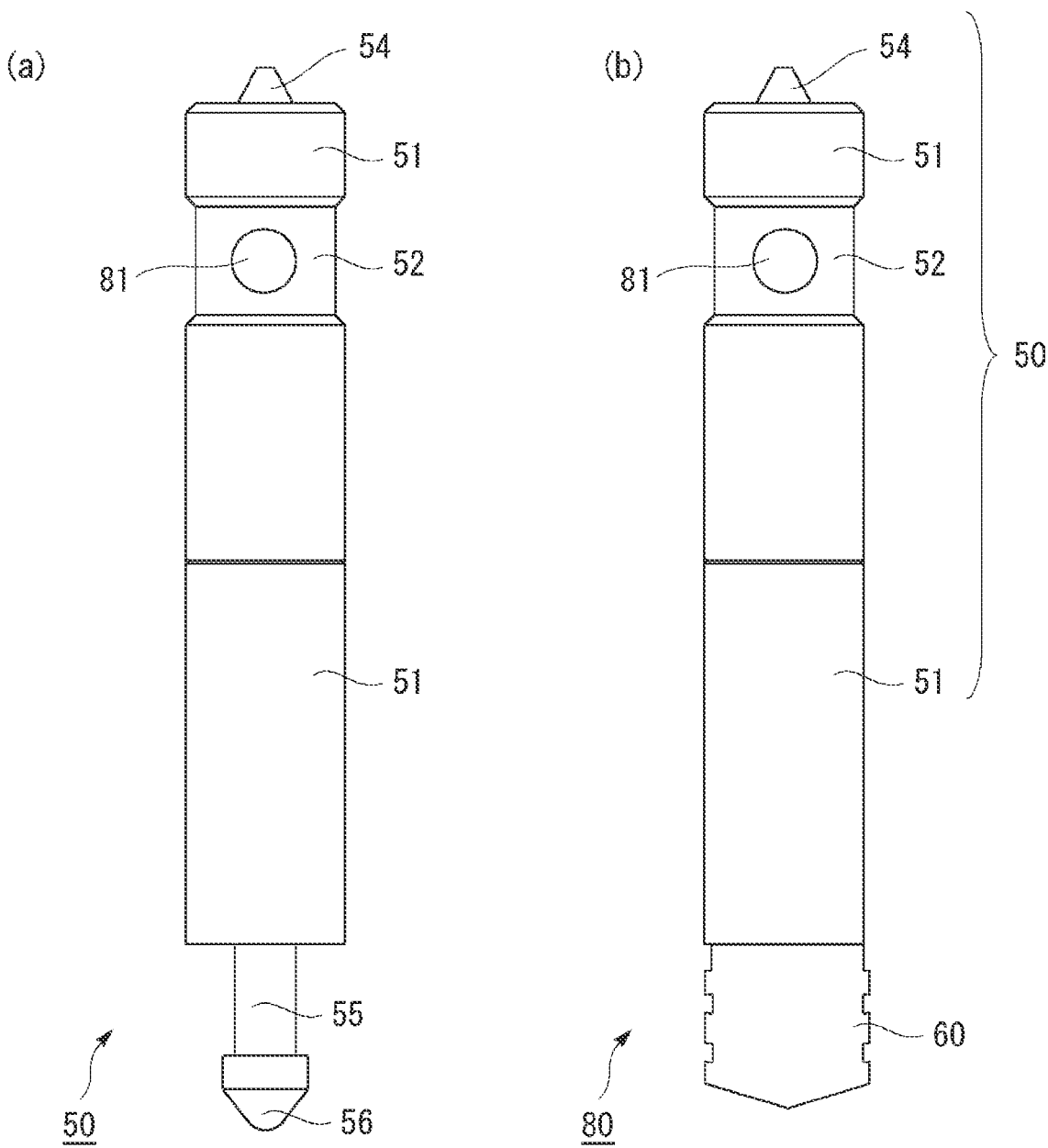
FIG. 9 is a diagram illustrating a schematic configuration of a plunger rod and plunger incorporated in the needleless injector.

Next, the plunger 80 will be described based on FIG. 9. FIG. 9 includes the diagram (a) on the left side that is an external view of a plunger rod 50, which is one of the components of the plunger 80, and a diagram (b) on the right side that is an external view of the plunger 80. The plunger 80 is a member that pressurizes the ejection solution by energy received from the piston 40, and a resin material suitable for the pressurization (for example, a resin material similar to that used for the attachment 30 can be used for the plunger rod 50. The plunger rod 50 includes a shaft member 51, and has a base end side end surface provided with a protrusion 54. The protrusion 54 is shaped and sized to be capable of fitting in the recess portion 44 of the shaft member of the piston 40 of the actuator 20, when the plunger 80 is incorporated in the injector assembly 10. A reduced diameter portion 52 that has a diameter smaller than other portions of the shaft member 51 is provided in an intermediate portion of the shaft member 51 close to the base end. The reduced diameter portion 52 is provided with a recess portion 81 of a predetermined size which will be described in detail below.

Further, in the plunger rod 50, a protrusion 56 is provided to a distal end side of the shaft member 51 with a neck portion 55 with a smaller diameter than the shaft member 51 provided in between. The protrusion 56 is shaped like a weight to have a diameter being greater than the diameter of the neck portion 55 near a portion to be connected with the neck portion 55 and reducing toward the distal end side. The maximum diameter of the protrusion 56 is smaller than the diameter of the shaft member 51. A stopper portion 60 formed of an elastic member such as rubber is attached to the neck portion 55 and the protrusion 56, whereby the plunger 80 is formed (see FIG. 9(b)). An attachment hole (not illustrated) is formed in the stopper portion 60, and engages with the neck portion 55 and the protrusion 56, so that the stopper portion 60 is less likely to be detached from the plunger rod 50.

Specific examples of materials of the stopper portion 60 include butyl rubber and silicon rubber. Further, there may be exemplified a styrene-based elastomer or a hydrogenated styrene-based elastomer, or a substance obtained by mixing a styrene-based elastomer or a hydrogenated styrene-based elastomer with polyolefin such as polyethylene, polypropylene, polybutene, and an α-olefin copolymer, oil such as liquid paraffin and process oil, or a powder inorganic substance such as talc, cast, and mica. Further, as the material of the stopper portion 60, a polyvinyl chloride-based elastomer, an olefin-based elastomer, a polyester-based elastomer, a polyimide-based elastomer, a polyurethane-based elastomer, various rubber materials (particularly, a vulcanized material) such as natural rubber, isoprene rubber, chloroprene rubber, nitrile butadiene rubber, and styrene butadiene rubber, or a mixture thereof may be employed. Furthermore, the stopper portion 60 pressurizes the ejection solution by sliding within the container 70 described below Thus, a surface of the stopper portion 60 and an inner wall surface 75a of the accommodating space 75 of the container 70 may be coated or processed using various matters, to guarantee/adjust slidability between the stopper portion 60 and the inner wall surface 75a of the accommodating space 75 of the container 70. Examples of the coating agent may include polytetrafluoroethylene (PTFE), silicon oil, diamond-like carbon, nano diamond, and the like.

Figure 10:
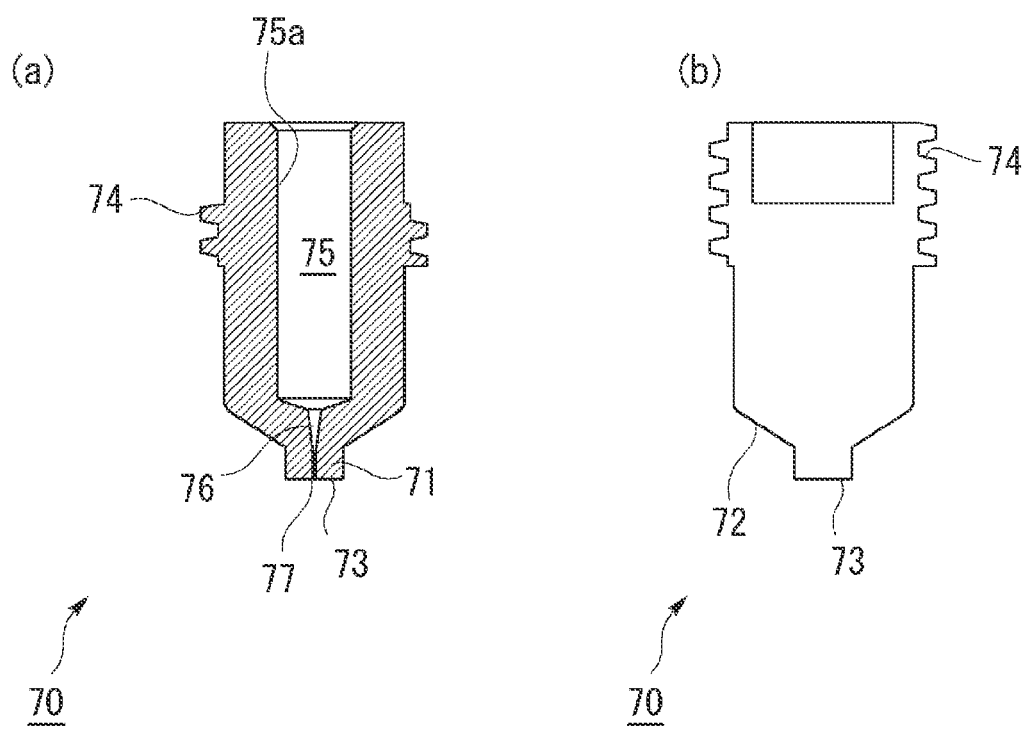
FIG. 10 is a diagram illustrating a schematic configuration of a container incorporated in the needleless injector.

Next, the container 70 will be described based on FIG. 10. Note that FIG. 10 includes the diagram (a) on the left side that is a cross-sectional view of the container 70, and the diagram (b) on the right side that is an external view of the container 70. The container 70 is a member containing an ejection solution to be pressurized by the plunger 80, and is a member that defines a flow path for injecting the pressurized ejection solution to the target region. In view of this, a resin material (a resin material of the same type as the attachment 30 for example) may be used for forming the container 70.

The container 70 includes an accommodating space 75, in which the stopper portion 60 of the plunger 80 are movable, accommodating the ejection solution, and a nozzle portion 71 including a flow path 76 connecting the accommodating space 75 to the outside of the container 70. The nozzle portion 71 has a columnar outer circumference on the distal end side. Note that in the injector assembly 10, as illustrated in FIG. 5, a positional relationship between the plunger 80 and the container 70 is determined so that the stopper portion 60 of the plunger 80 can slide within the accommodating space 75 in a direction toward the nozzle portion 71 (direction toward the distal end side). The ejection solution is sealed in a space defined by stopper portion 60 of the plunger 80 and the container 70. The flow path of the container 70 opens in a distal end surface 73 of the nozzle portion 71, so that the ejection port 77 is formed. Thus, when the plunger 80 slides within the accommodating space 75, the ejection solution accommodated in the accommodating space 75 is pressurized to be ejected from the ejection port 77 through the flow path 76.

The flow path 76 provided in the container 70 has a diameter smaller than the inner diameter of the accommodating space 75. With this configuration, the ejection solution that has been applied with a high pressure is ejected to the outside through the ejection port 77. The male thread portion 74 for attaching the container 70 to the attachment 30 is formed on the base end side of the container 70. The male thread portion 74 is screwed with the female thread portion 36 of the attachment 30.

Note that the profile on the distal end side of the stopper portion 60 of the plunger 80 is shaped to substantially match the profile of the inner wall surface 75a near a portion where the accommodating space 75 and the flow path 76 are connected to each other (the deepest part of the accommodating space 75). With this configuration, a smallest possible gap can be formed between the stopper portion 60 and the inner wall surface 75a of the container 70 when the plunger 80 slides for ejecting the ejection solution and reaches the deepest part of the accommodating space 75, whereby the ejection solution can be prevented from wastefully remaining in the accommodating space 75. However, the shape of the stopper portion 60 is not limited to a particular shape as long as desired effects can be obtained with the injector 1 according to the present embodiment.

Now, how the injector assembly 10 is assembled will be described. In a state where the stopper portion 60 of the plunger 80 is inserted to the deepest part of the accommodating space 75 of the container 70, the plunger 80 is retracted with the ejection port 77 of the container 70 in communication with the ejection solution. The stopper portion 60 and the inner wall surface 75a of the accommodating space 75 are suitably in close contact with each other, the retraction action will produce negative pressure in the accommodating space. Thus, the accommodating space 75 can be filled with the ejection solution through the ejection port 77. In this process, the plunger 80 is retracted to an extent enough for making the part of the plunger 80 (plunger rod 50) protruding from the container 70 pass through the second region 34 to reach the first region 33 (the region 33b illustrated in FIG. 8), when the container 70 is attached to the attachment 30 in this state.

After the container 70 filled with ejection solution in the accommodating space 75 is attached to the attachment 30, the actuator 20 is inserted to the attachment 30 from the side of the first region 33. The actuator 20 is inserted until the distal end surface of its distal end portion 21b comes into contact with a distal end surface 33c of the region 33b of the attachment 30 (see FIG. 8). Then, in this process, the male thread portion 26 provided to the center portion 21a of the actuator 20 is screwed with the female thread portion 32 of the attachment 30, whereby the actuator 20 and the attachment 30 are suitably coupled to each other. Furthermore, in this process, the recess portion 44 of the shaft member 41 of the piston 40, which is incorporated in the actuator 20, engages with the protrusion 54 of the shaft member 51 of the plunger 80, and the plunger 80 is pushed by the piston 40 toward the distal end side. Note that, a fixing force of the piston 40 in the distal end portion 21b of the actuator 20 is set to an extent that the piston 40 can slide in the distal end portion 21b in a sufficiently smooth manner by, a pressure received from the combustion product produced by the igniter 22, and to an extent that the piston 40 can suitably resist force received from the plunger 80 so that the position of the piston 40 is not displaced when the injector assembly 10 is assembled. Alternatively, a stopper may be formed at an intended position of the piston 40, so that the top surface of the first flange 42 of the piston 40 faces the combustion chamber 20a of the actuator 20 and is not displaced toward the combustion chamber 20a as illustrated in FIG. 6.

Thus, when the actuator 20 is attached to the attachment 30 to which the container 70 and plunger 80 are attached as described above, the plunger 80 is pushed to move from the piston 40 toward the distal end side, whereby the plunger 80 is positioned at a predetermined position within the container 70. Note that, in response to pressing of the plunger 80, a part of the ejection solution is discharged from the ejection port 77.

When the plunger 80 is thus positioned at the final position as described above, formation of the injector assembly 10 is completed. In this injector assembly 10, the position of the stopper portion 60 of the plunger 80 in the accommodating space 75 of the container 70 is mechanically determined. The final position of the stopper portion 60 is a position uniquely determined in the injector assembly 10, and hence an amount of the ejection solution that is finally stored in the accommodating space 75 in the injector assembly 10 can be a predetermined amount determined in advance.

The injector assembly 10 thus configured can be loaded into the housing 2 with the ignition pin 22b of the igniter 22 fitted into the socket 7 on the housing 2, whereby the injector 1 is prepared to be usable (see FIGS. 1 to 3). The user holds the housing 2 of such injector 1 with one hand and slides the first switch 5 located on the back side of the housing 2 for a predetermined period of time, putting the injector 1 in the standby state. In this state, when the user presses the second switch 6 with the ejection port 77 being in contact with the target region, the igniter 22 is actuated, and the ejection solution is pressurized via the piston 40 and the plunger 80. Thus, the ejection is implemented, and the ejection solution is injected into the target region.

Safety Mechanism with Plunger 80

First Embodiment

Figure 11:
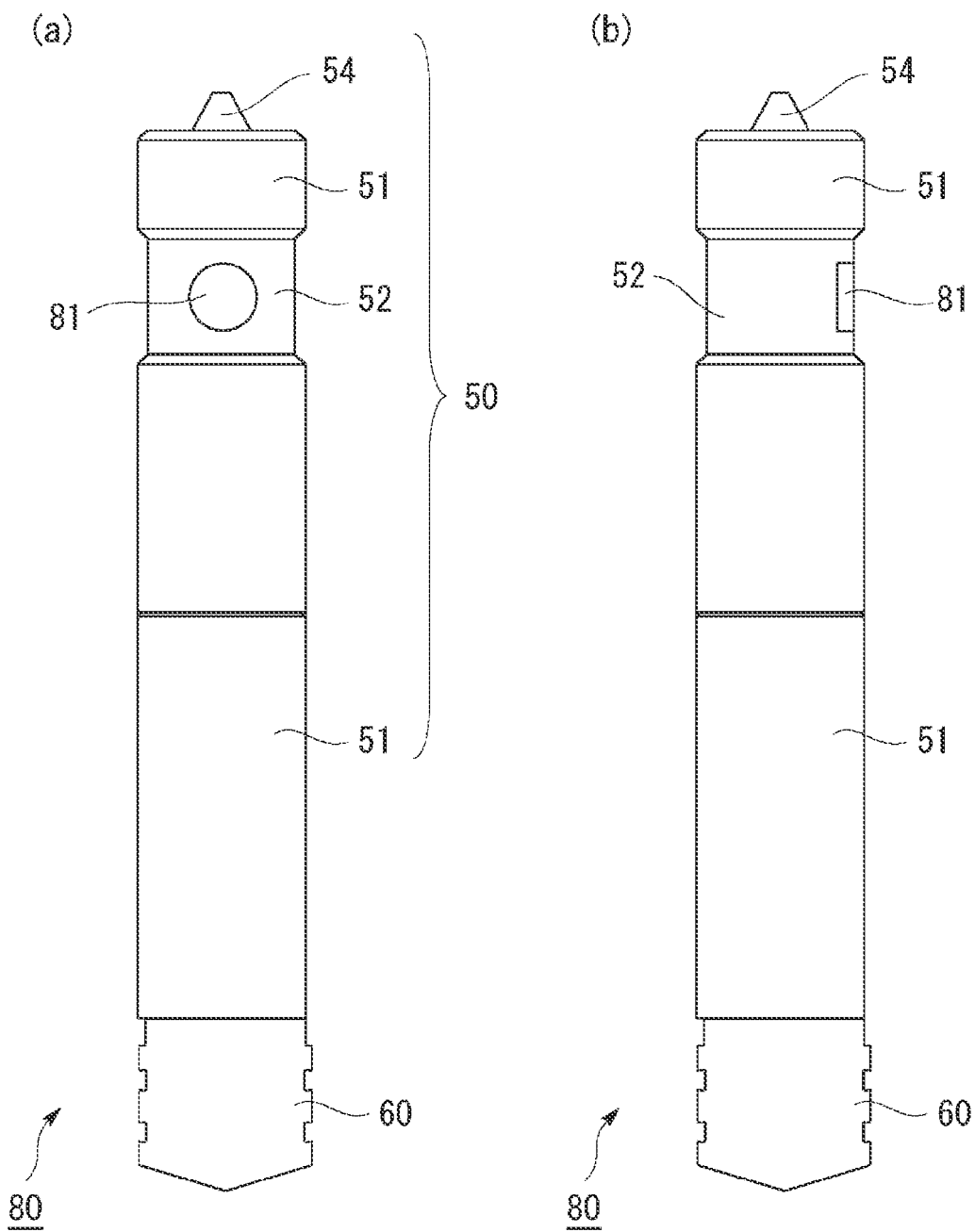
FIG. 11 is a diagram illustrating a schematic configuration of a plunger according to a first embodiment.

A first embodiment of a safety mechanism of the injector 1 will now be described based on FIG. 11. FIG. 11 is a diagram illustrating a schematic configuration of the plunger 80. FIG. 11 include a diagram (a) on the left side that is an external view of the plunger 80 (similar to one illustrated in FIG. 9(b)) and a diagram (b) which is an external view illustrated the plunger 80 rotated by 90 degrees from the state illustrated in the diagram (a). The plunger 80 has the reduced diameter portion 52 provided with one recess portion 81 having a circular opening shape. Thus, the recess portion 81 is positioned on one side in the circumferential direction of the reduced diameter portion 52.

Figure 12:
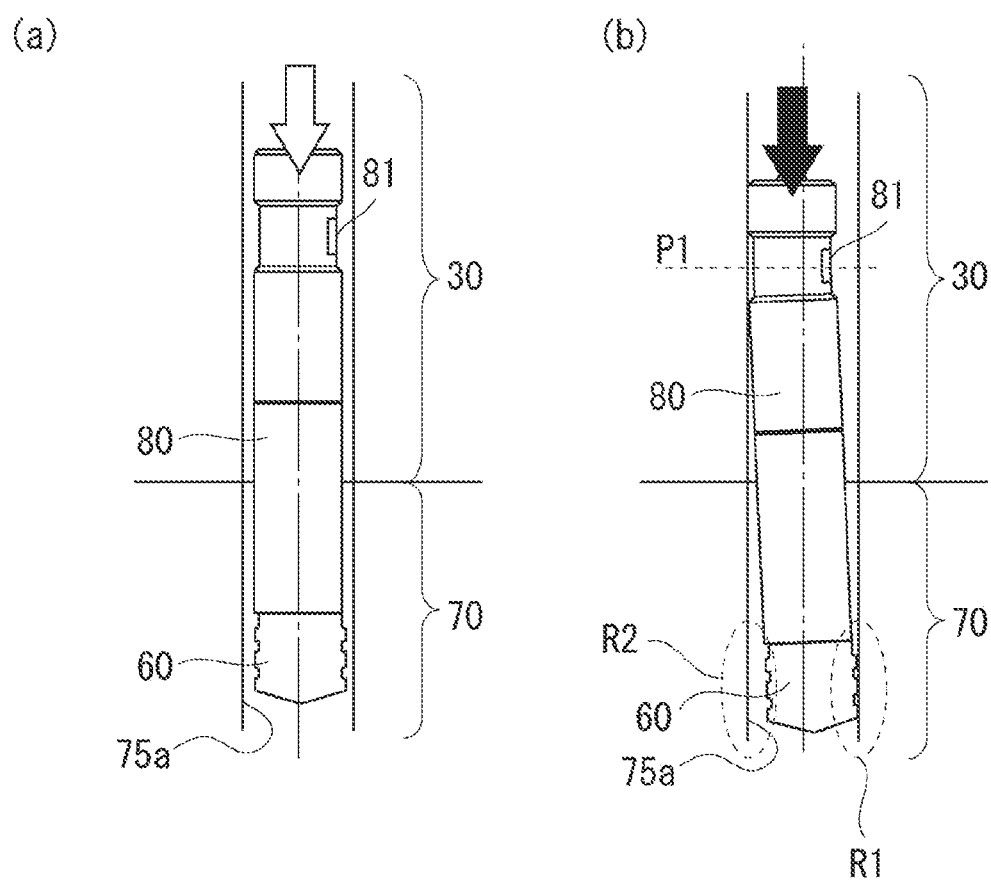
FIG. 12 is a diagram illustrating behavior of the plunger illustrated in FIG. 11 within the injector when force exceeding a predefined force is applied to the plunger in the needleless injector.

Now, the diameter and depth of the recess portion 81 will be described based on FIG. 12. The diagram (a) on the left side in FIG. 12 illustrates a state of movement of plunger 80 in a case where the force applied to the plunger 80 via the piston 40 by actuation of igniter 22 (hereinafter referred to as "driving force") is equal to or smaller than predefined force. On the other hand, the diagram (b) on the right side in FIG. 12 illustrates a state of movement of the plunger 80 in a case where the driving force applied to the plunger 80 exceeds the predefined force. Note that the predefined force in the present application is an upper limit value of the driving force assumed to be safely applicable for pressurizing the ejection solution accommodated in the accommodating space 75. In other words, the injector 3 is designed such that injection to the target region can be implemented with the ejection solution safely ejected as long as the driving force applied to the plunger 80 is equal to or smaller than the predefined force. Here, the expression "safely" refers to a state in which the ejection solution is suitably ejected from the ejection port 77 without inappropriately leaking or scattering due to breakage or the like of the container 70 which is a part of the injector 1. Thus, the expression has nothing to do with the biological effect of the ejection solution on the target region or the like. It should also be noted that in FIGS. 12(a) and 12(b), the gap between the inner wall surfaces (inner wall surface on the side of the attachment 30 and the inner wall surface on the side of the container 70) of a path (hereinafter, referred to as a "movement path") in which the plunger 80 moves and the plunger 80 is illustrated in an exaggerated manner, for the sake of easier understanding of the behavior of the plunger 80.

The diameter and the depth of the recess portion 81 of the plunger 80 are determined so that as long as the driving force applied to the plunger 80 does not exceed the predefined force, the plunger 80 does not substantially deform as illustrated in FIG. 12(a), that is, the shaft member 51 in a straight state before the application of the driving force moves in the movement path. In other words, the recess portion 81 is designed so that the ejection solution can be suitably pressurized with the plunger 80 even when the recess 81 is provided, as long as the driving force applied to the plunger 80 does not exceed the predefined force.

Further, the recess portion 81 of plunger 80 is designed to cause intended deformation of the plunger 80 as illustrated in FIG. 12(b) when the driving force applied to plunger 80 exceeds the predefined force (also referred to as "excessive driving force"). Specifically, the diameter and depth of the recess portion 81 is determined such that when the driving force exceeds the predefined force, the plunger 80 bends near a position P1 of the plunger 80 in the axial direction at which the recess 81 is provided. With the recess portion 81, the strength against the driving force decreases in the vicinity of the recess 81 compared with a portion where the recess 81 is not provided, and thus the plunger 80 is deformed as described above. Thus, the recess portion 81 serves as a weakened part of the plunger 80. Such a deformation results in a part of the energy of the excessive driving force being consumed due to the deformation, and also results in the stopper portion 60 of the plunger 80 being in contact with one side of the inner wall surface 75a of the container 70. In FIG. 12(b), the stopper portion 60 is in contact with the inner wall surface 75a in a right side region R1 but is not in contact with the inner wall surface 75a in a left side region R2. Furthermore, the deformation of the plunger 80 in the recess portion 81 (the weakened part) leads to stronger or larger contact between the plunger 80 and the inner wall surface on the side of the attachment 30 and the inner wall surface on the side of the container 70, resulting in relatively large frictional force or resistance against the sliding motion of the plunger 80.

When the one-sided contact state is achieved in this manner, the frictional force during movement, that is, while the plunger 80 moves within the accommodating space 75, becomes greater than frictional force during movement without the one-sided contact state achieved (that is, the state illustrated in FIG. 12(a)). Thus, the energy of the excessive driving force is further consumed by the frictional force between the stopper portion 60 and the container 70 and the frictional force between the plunger 80 and the attachment 30. As a result, when the excessive driving force is applied to the plunger 80, the distal end of the stopper portion 60 can be prevented from reaching the deepest part of the accommodating space 75, or the distal end of the stopper portion 60 reaches the inner wall surface but with the magnitude of the force applied to the inner wall surface until the distal end reaches the inner wall surface regulated within a predetermined range enabling the normal shape of the container 70 to be maintained. Note that the predetermined range of force not causing breakage of the container 70 resulting in scattering or the like of the ejection solution.

In the injector 1, the driving force applied to the plunger 80 by the actuation of the igniter 22 is designed to fall within a range not exceeding the predefined force, but even with such a configuration, the injector 1 cannot be completely free of risk of the driving force exceeding the predefined force due to some unexpected reason. When the plunger 80 does not deform by receiving the application of excessive driving force overwhelming the predefined force, the energy of the excessive driving force pressurizes the ejection solution via the plunger 80. Thus, depending on the pressurizing force, the container 70 may unintentionally break. In view of this, the injector 1 of the present application has the recess portion 81 provided to the plunger 80. Thus, even when excessive driving force is applied to the plunger 80, the plunger 80 is intentionally deformed so that the energy of the excessive driving force is consumed. As a result, the load on the container 70 can be reduced, and thus the container 70 can be prevented from breaking.

Thus, the recess portion 81 serving as a weakened part of the plunger 80 functions as a safety mechanism of the injector 1 in a case where the excessive driving force is applied to the plunger 80, whereby the safety of the injection using the injector 1 can be guaranteed. Note that while in the embodiment described above, one recess portion 81 is provided in the reduced diameter portion 52, a plurality of the recess portions 81 may be arranged side by side in the circumferential direction of the reduced diameter portion 52. With this configuration, the plurality of recess portions 81 are preferably arranged in a one-sided manner rather than being arranged at an equal interval along the circumferential direction of the reduced diameter portion 52, so that the plunger 80 can bend in a certain direction upon receiving excessive driving force. One or a plurality of the recess portions 81 may be not only provided in the reduced diameter portion 52 but may also be provided on the shaft member 51.

Second Embodiment

Figure 13:
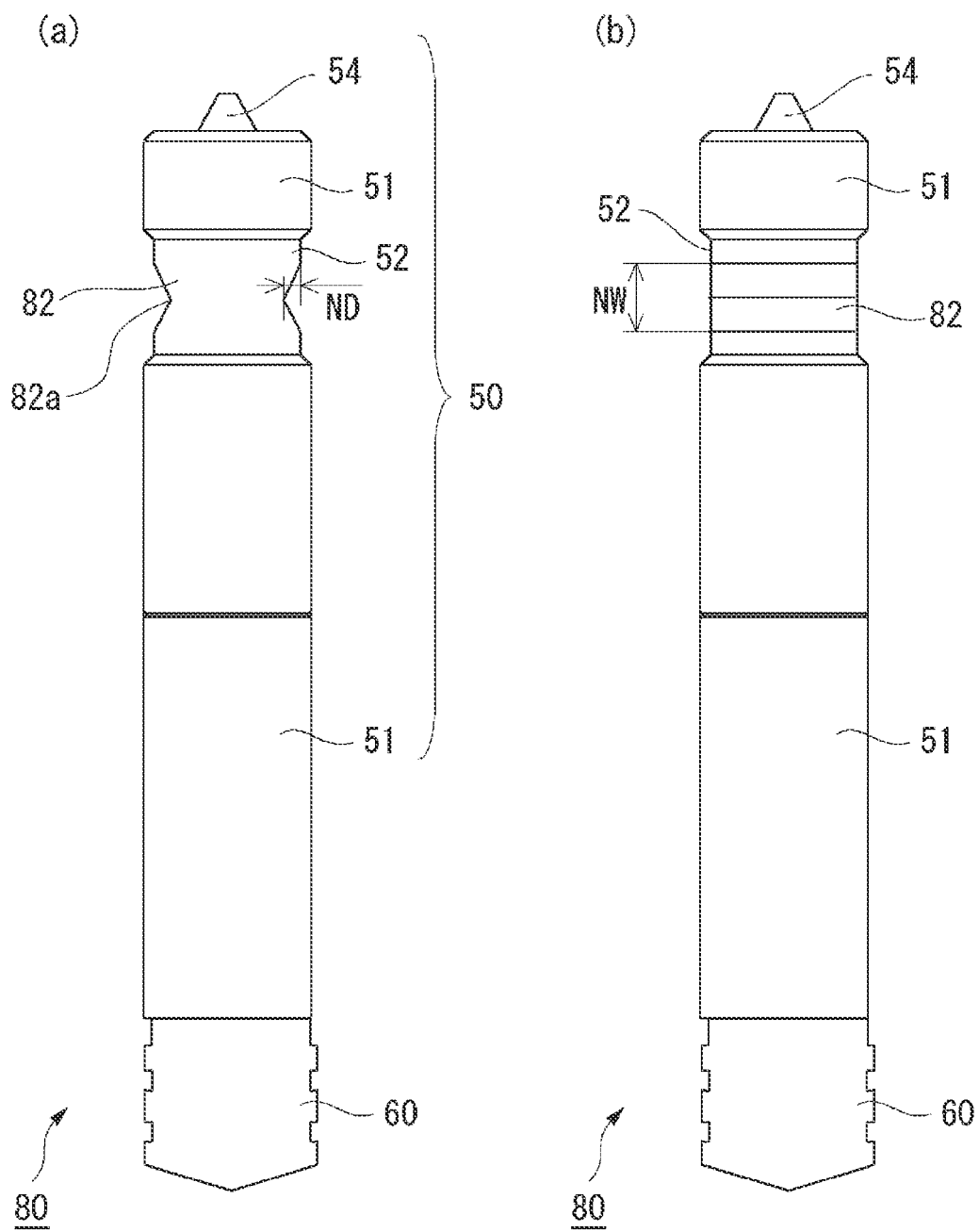
FIG. 13 is a diagram illustrating a schematic configuration of a plunger according to a second embodiment.

A second embodiment of a safety mechanism of the injector 1 will now be described based on FIG. 13. FIG. 13 is a diagram illustrating a schematic configuration of the plunger 80. FIG. 13 include a diagram (a) on the left side that is an external view of the plunger 80 and a diagram (b) which is an external view illustrated the plunger 80 rotated by 90 degrees from the state illustrated in the diagram (a). The plunger 80 has a notch 82, corresponding to a groove portion, formed in the reduced diameter portion 52 and extending over a portion thereof in the circumferential direction. The deepest portion in notch 82 is defined as a notch bottom portion 82a. The notch 82 has a notch depth ND between the surface position of the reduced diameter portion 52 and the notch bottom portion 82a, and a notch width NW as an axial direction length of a portion of the plunger 80 where the notch 82 is formed.

Figure 14:
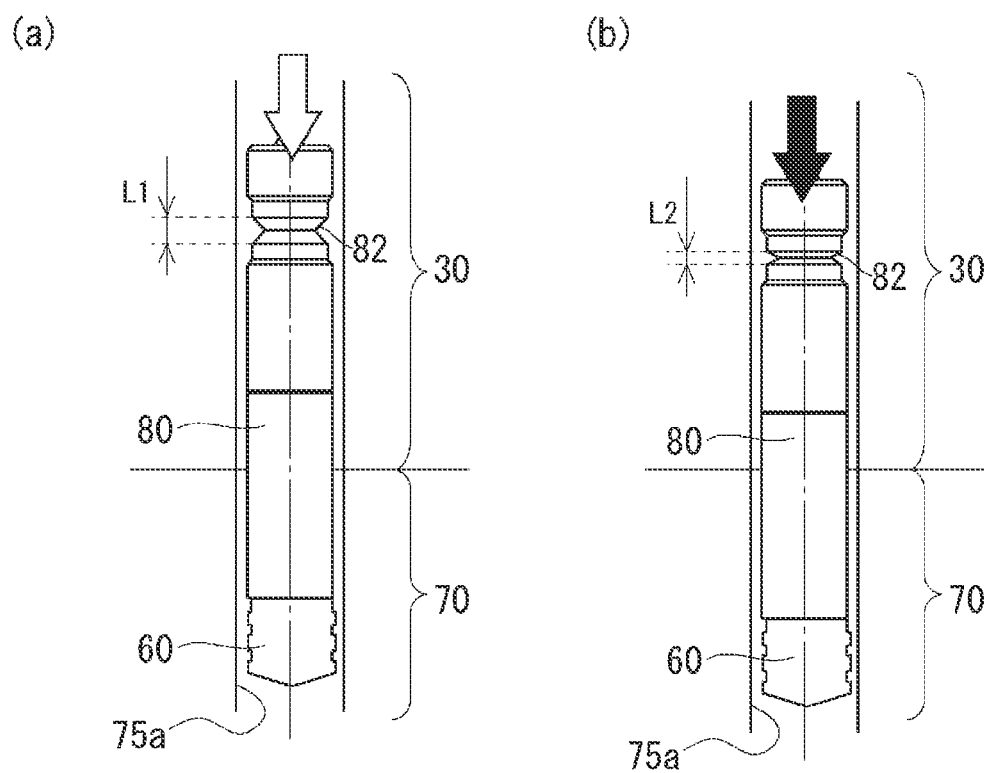
FIG. 14 is a diagram illustrating behavior of the plunger illustrated in FIG. 13 within the injector when force exceeding a predefined force is applied to the plunger in the needleless injector.

The depth ND and the width NW of the notch 82 will now be described based on FIG. 14. A diagram (a) on the left side in FIG. 14 illustrates a state of movement of the plunger 80 when the driving force not exceeding the predefined force is applied to the plunger 80 due to the actuation of the igniter 22, and a diagram (b) on the right side in FIG. 14 illustrates a state of movement of the plunger 80 when the driving force exceeding the predefined force is applied to the plunger 80. It should be noted that also in FIGS. 14(a) and 14(b), the gap between the inner wall surfaces of the movement path of the plunger 80 and the plunger 80 is illustrated in an exaggerated manner, for the sake of easier understanding of the behavior of the plunger 80, as in FIGS. 12(a) and 12(b).

The depth ND and the notch width NW of the notch 82 of the plunger 80 are determined so that as long as the driving force applied to the plunger 80 does not exceed the predefined force, the plunger 80 does not substantially deform as illustrated in FIG. 14(a), that is, the shaft member 51 in a straight state before the application of the driving force moves in the movement path. In other words, in FIG. 14(a), the notch 82 is designed so the notch width NW of the notch 82 is maintained to be initially L1 and thus the ejection solution can be suitably pressurized by the plunger 80 even when the notch 82 is provided, as long as the driving force applied to the plunger 80 does not exceed the predefined force.

Furthermore, the notch 82 of the plunger 80 is designed to make the plunger 80 intentionally deform as illustrated in FIG. 14(b), when the excessive driving force is applied to the plunger 80. Specifically, the depth ND and the notch width NW of the notch 82 are determined so that when the driving force exceeds the predefined force, the plunger 80 is buckled around the notch bottom portion 82a of the notch 82 to have the axial direction length reduced. In FIG. 14(b), the notch width NW of the notch 82 is reduced to L2 which is shorter than the initial L1. By providing the notch 82, the strength against the driving force decreases in the vicinity thereof compared with a portion where the notch 82 is not provided, and thus the plunger 80 deforms as described above. Thus, the notch 82 serves as a weakened part of the plunger 80. Such a deformation results in a part of the energy of the excessive driving force being consumed due to the deformation, and also results in the plunger 80 itself being shorter. As a result, when the excessive driving force is applied to the plunger 80, the distal end of the stopper portion 60 can be prevented from reaching the deepest part of the accommodating space 75, or the distal end of the stopper portion 60 reaches the deepest part but with the magnitude of the force applied to the inner wall surface until the distal end reaches the inner wall surface regulated within a predetermined range enabling the normal shape of the container 70 to be maintained. Note that the predetermined range is the same as that in the first embodiment described above.

Thus, also in the injector 1 of the second embodiment, even when excessive driving force is applied to the plunger 80, the plunger 80 is intentionally deformed due to the notch 82 so that the energy of the excessive driving force is consumed. As a result, the load on the container 70 can be reduced, and thus the container 70 can be prevented from breaking, as in the injector of the first embodiment. Thus, the notch 82 serving as a weakened part of the plunger 80 functions as a safety mechanism of the injector 1 in a case where the excessive driving force is applied to the plunger 80, whereby the safety of the injection using the injector 1 can be guaranteed. Note that while in the embodiment described above, the notch 82 is provided in the circumferential direction over a portion of the reduced diameter portion 52, the notch 82 may be provided in the circumferential direction over an entirety of the reduced diameter portion 52.

Third Embodiment

Figure 15:
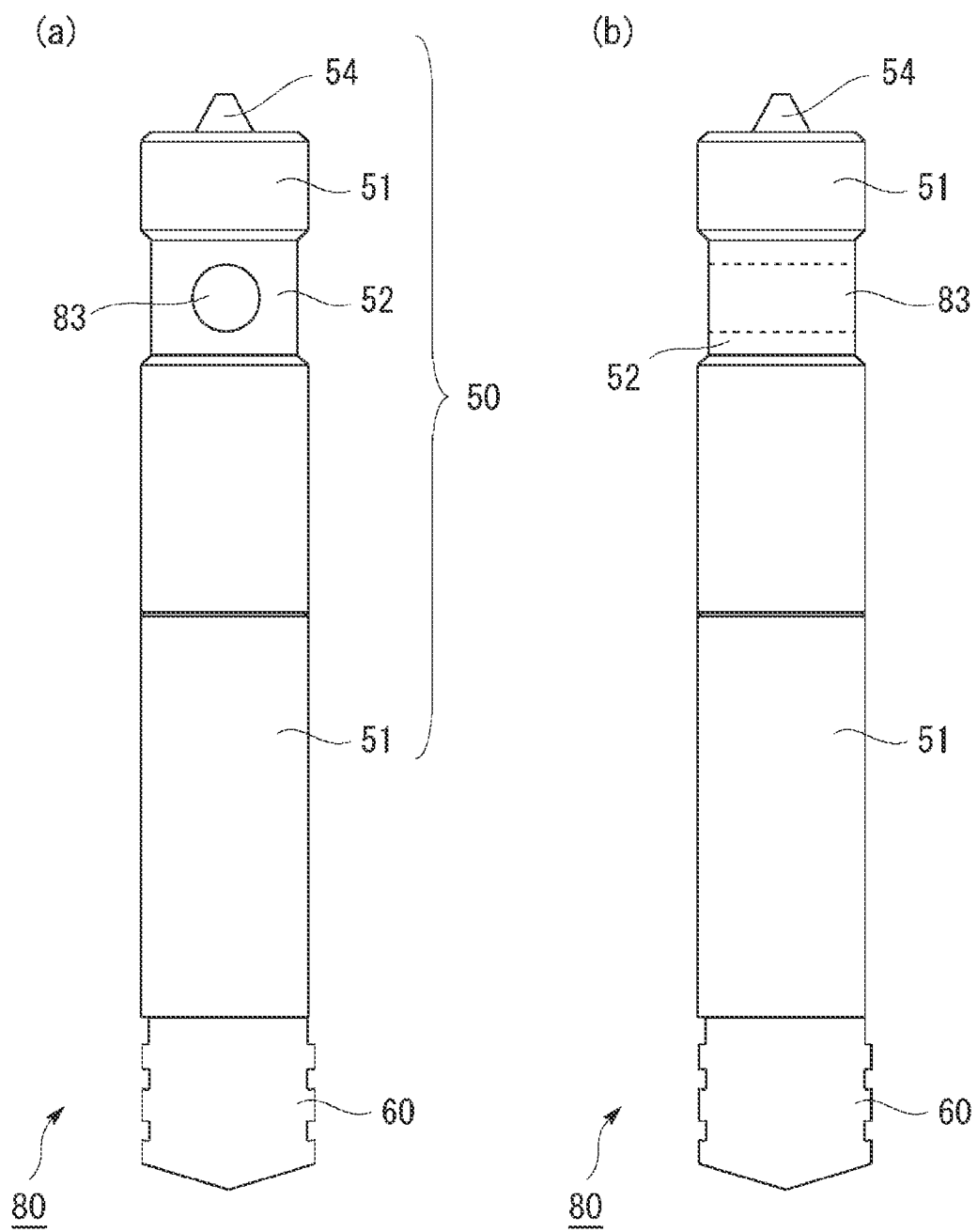
FIG. 15 is a first diagram illustrating a schematic configuration of a plunger according to a third embodiment.

A third embodiment of a safety mechanism of the injector 1 will now be described based on FIG. 15. FIG. 15 is a diagram illustrating a schematic configuration of the plunger 80. FIG. 15 include a diagram (a) on the left side that is an external view of the plunger 80 and a diagram (b) which is an external view illustrated the plunger 80 rotated by 90 degrees from the state illustrated in the diagram (a). The plunger 80 has a through hole 83 formed having a circular opening shape in the reduced diameter portion 52, the through hole 83 serving as the weakened part of the plunger 80.

Specifically, as described above in the second embodiment, the diameter of the through hole 83 is determined so as not to cause deformation of the plunger 80 as long as the driving force applied to the plunger 80 does not exceed the predefined force. The diameter is determined to make the through hole 83 crushed when the driving force applied to the plunger 80 exceeds the predefined force, so that the plunger 80 is buckled to have the axial direction length reduced. With the through hole 83 thus formed, the through hole 83 serving as a weakened part of the plunger 80 functions as a safety mechanism of the injector 1 in a case where the excessive driving force is applied to the plunger 80, whereby the safety of the injection using the injector 1 can be guaranteed.

Figure 16:
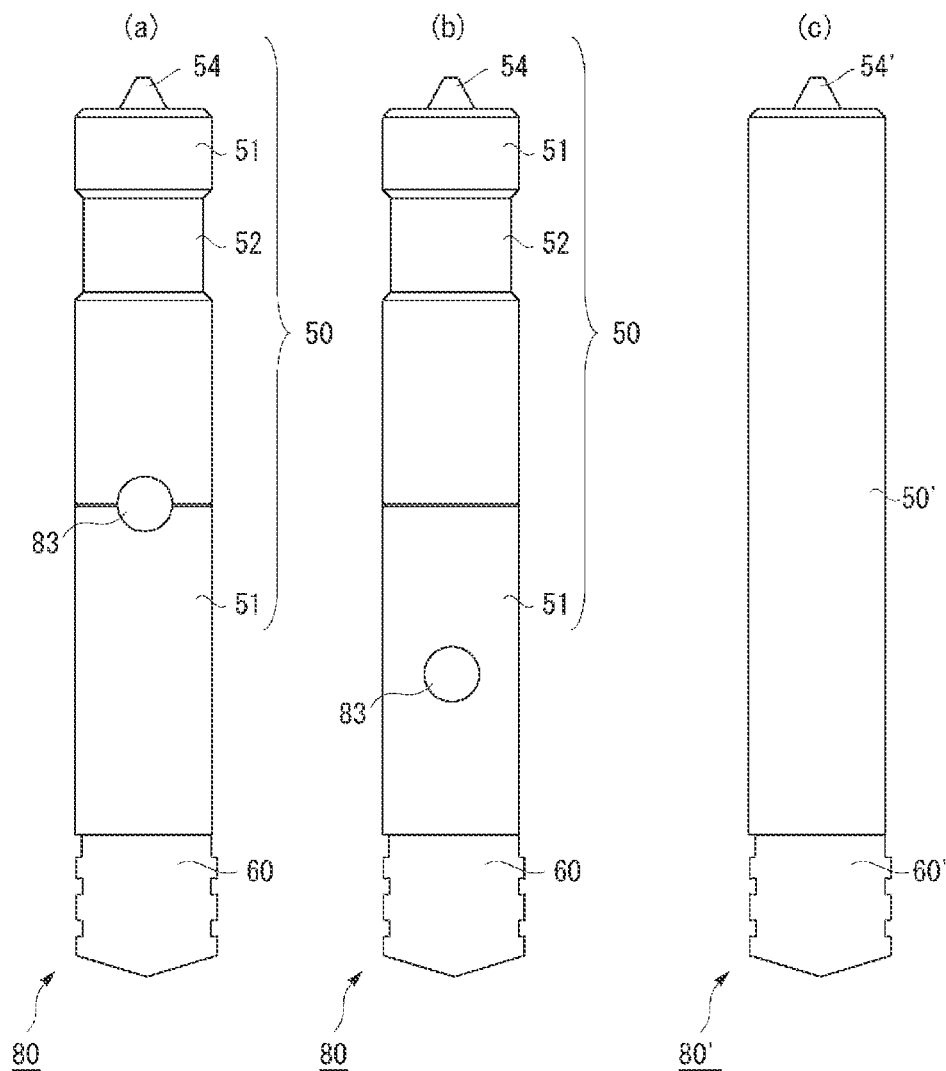
FIG. 16 is a second diagram illustrating a schematic configuration of a plunger according to a third embodiment.

Other embodiments with the through hole serving as the weakened part is provided as described above will be described based on FIG. 16. FIGS. 16(a) and 16(b) illustrate another schematic configuration of the plunger 80 of the present disclosure, and FIG. 16(c) illustrates a schematic configuration of a plunger 80' of a comparative example. Note that the plungers 80 illustrated FIGS. 16(a) and 16(b) is the same as the plunger 80 illustrated in FIG. 15, except for the arrangement of the through hole 83. Specifically, the plunger 80 illustrated in FIG. 16(a) has the through hole 83 provided at substantially the center of the plunger rod 50 in the axial direction. The plunger 80 illustrated in FIG. 16(b) has the through hole 83 provided closer to the stopper portion 60 than the through hole 83 arranged as illustrated in FIG. 16(a) is. The plunger 80' illustrated in FIG. 16(c) has no configuration corresponding to reduced diameter portion 52 provided to a plunger rod 50' nor has the through hole 83. In other words, the plunger 80' only includes the plunger rod 50' and a stopper portion 60'.

Experimentation is performed with 200 µl of ejection solution ejected using the injectors 1 including the plungers 80 and 80' illustrated in FIG. 16(a) to (c), with a predetermined amount of ZPP used as the ignition charge. Note that the amount of ZPP used is determined to intentionally apply excessive pressure on the ejection solution when 200 µl of ejection solution is ejected.

Experimental Results

Mode in FIG. 16(a): Plunger rod 50 deformed, container 70 not damaged

Mode in FIG. 16(b): Plunger rod 50 deformed, container 70 not damaged

Mode in FIG. 16(c): Plunger rod 50' deformed, container 70 damaged

This ejection experiment clearly indicates that the container 70 can be favorably prevented from breaking by providing, at least in the plunger 80, the reduced diameter portion 52 and the through hole 83 provided at a portion closer to the stopper portion 60 than the center of the plunger rod 50. A more detailed inspection on the modes in FIGS. 16(a) and 16(b) has revealed that the plunger rod 50 has deformed before the stopper portion 60 of the plunger 80 has reached the deepest part of the accommodating space 75 of the container 70. Thus, it can be concluded that with the plungers 80 of the modes in FIGS. 16(a) and 16(b), the plunger rod 50 favorably deforms in response to an excessive pressure to the ejection solution during a process in which the plunger 80 moves in the accommodating space 75 due to the combustion of the ignition charge, so that application of excessive pressure on the inner wall surface of the container 70 can be prevented, and thus the container 70 can be prevented from breaking.

Other Embodiments

The plunger 80 may be designed to have the reduced diameter portion 52 with the thickness adjusted, so that the reduced diameter portion 52 itself buckles when the driving force applied to the plunger 80 exceeds the predefined force, instead of providing the notch 82 or the through hole 83 as described above. The plunger 80 thus configured can have the reduced diameter portion 52 serving as the weakened part described above.

Each aspect disclosed in the present specification can be combined with any other feature disclosed herein.

REFERENCE SIGNS LIST

- 1 Injector
- 2 Housing
- 2a Grip portion
- 3 Power cable
- 4 Connector
- 5 First switch
- 6 Second switch
- 10 Injector assembly
- 20 Actuator
- 21 Body
- 22 Igniter
- 30 Attachment
- 31 Body
- 40 Piston
- 50 Plunger rod
- 51 Shaft member
- 52 Reduced diameter portion
- 60 Stopper portion
- 70 Container
- 71 Nozzle portion
- 75 Accommodating space
- 76 Flow path
- 77 Ejection port
- 80 Plunger
- 81 Recess portion
- 82 Notch
- 83 Through hole

What is claimed is:

1. A needleless injector comprising:
a housing part including an accommodating space that is configured to accommodate a substance intended for injection;
an actuator configured to generate an ejection energy;
and a plunger coupled to the housing part so as to define the accommodating space, the plunger including a base end that receives the ejection energy generated by the actuator as a driving force, a distal end that defines the accommodating space, a weakened part provided between the base end and the distal end, and, prior to activation of the actuator, a center axis of the plunger is parallel with a longitudinal axis of the housing,
wherein upon activation of the actuator, the plunger is configured to move in the housing part by the driving force so that the distal end reaches to a deepest part of the housing part when the driving force is equal to or smaller than a predefined force, and the plunger is configured to bend by bending the center axis of the plunger at the weakened part by the driving force before the distal end reaches the deepest part of the housing part when the driving force exceeds the predefined force.

2. The needleless injector according to claim 1, wherein the distal end of the plunger is prevented from reaching the deepest part of the housing part when the driving force exceeds the predefined force.

3. The needleless injector according to claim 1, wherein the plunger is configured to bend at the weakened part by the driving force so that a first force applied to an inner surface of the housing part is within a predetermined range at a time when the distal end reaches to the deepest part, when the driving force exceeds the predefined force.

4. The needleless injector according to claim 1, wherein the housing part further includes an inner surface, a first frictional force is generated between the plunger and the inner surface as the plunger moves in the housing part when the driving force is equal to or smaller than the predefined force, a second frictional force is generated between the plunger and the inner surface as the plunger moves in the housing part when the driving force exceeds the predefined force, and the plunger is configured to bend by the driving force, when the driving force exceeds the predefined force, so that the second frictional force is greater than the first frictional force.

5. The needleless injector according to claim 1, wherein the plunger is further including a shaft member, and the weakened part is smaller in diameter than the shaft member.

6. The needleless injector according to claim 1, wherein the plunger further includes a notch as the weakened part.

7. The needleless injector according to claim 1, wherein the plunger further includes a through hole as the weakened part.

8. The needleless injector according to claim 1, wherein the housing part is a container.

9. The needleless injector according to claim 1, wherein when the driving force exceeds the predefined force, the plunger is configured to bend such that a portion of the plunger between the base end and the weakened part is bent with respect to a portion of the plunger between the distal end and the weakened part before the distal end reaches the deepest part of the housing part.

10. The needleless injector according to claim 9, wherein the center axis of the plunger comprises a first center axis between the base end and the weakened part and a second center axis between the distal end and the weakened part, wherein when the plunger is bent, the first center axis offsets with respect to the longitudinal axis of the housing, and the second center axis inclines with respect to the longitudinal axis of the housing part.

11. The needleless injector according to claim 1, wherein the actuator includes an igniter.

* * * * *